(12) United States Patent
Goto et al.

(10) Patent No.: US 8,679,991 B2
(45) Date of Patent: Mar. 25, 2014

(54) PREPREG, INTERMEDIATE MATERIAL FOR FORMING FRP, AND METHOD FOR PRODUCTION THEREOF AND METHOD FOR PRODUCTION OF FIBER-REINFORCED COMPOSITE MATERIAL

(75) Inventors: Kazuya Goto, Irvine, CA (US); Kazuki Koga, Aichi-ken (JP); Tadayoshi Saitou, Aichi-ken (JP); Akihiro Ito, Aichi-ken (JP); Tsuneo Takano, Aichi-ken (JP); Kouki Wakabayashi, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 30 days.

(21) Appl. No.: 13/446,722

(22) Filed: Apr. 13, 2012

(65) Prior Publication Data
US 2012/0276795 A1    Nov. 1, 2012

Related U.S. Application Data

(62) Division of application No. 13/037,696, filed on Mar. 1, 2011, which is a division of application No. 12/244,676, filed on Oct. 2, 2008, now abandoned, which is a division of application No. 10/521,433, filed as application No. PCT/JP03/09176 on Jul. 18, 2003, now abandoned.

(30) Foreign Application Priority Data

| Jul. 18, 2002 | (JP) | 2002-210123 |
|---|---|---|
| Aug. 12, 2002 | (JP) | 2002-234861 |
| Sep. 18, 2002 | (JP) | 2002-271850 |
| Dec. 5, 2002 | (JP) | 2002-353759 |
| Mar. 10, 2003 | (JP) | 2003-063166 |

(51) Int. Cl.
B32B 5/18    (2006.01)
B32B 5/22    (2006.01)

(52) U.S. Cl.
USPC ............. 442/76; 442/164; 442/172; 442/179; 442/180; 442/286

(58) Field of Classification Search
USPC .................... 442/76, 164, 172, 179, 180, 286
See application file for complete search history.

(56) References Cited

U.S. PATENT DOCUMENTS

| 3,901,833 A | 8/1975 | Flynn |
| 4,332,767 A | 6/1982 | Kitanaka et al. |

(Continued)

FOREIGN PATENT DOCUMENTS

| AU | 199861449 | 8/1998 |
| AU | 199964820 | 5/2000 |

(Continued)

OTHER PUBLICATIONS

Extended European Search Report issued Jan. 9, 2013 in Patent Application No. 10177311.7.

(Continued)

*Primary Examiner* — Andrew Piziali
(74) *Attorney, Agent, or Firm* — Oblon, Spivak, McClelland, Maier, & Neustadt, L.L.P.

(57) ABSTRACT

The invention relates to a prepreg containing a reinforcing fiber, a sheet-like reinforcing fiber substrate including the reinforcing fiber, and a matrix resin, wherein the matrix resin is impregnated into the sheet-like reinforcing fiber substrate and also covers one surface of the sheet-like reinforcing fiber substrate, such that the matrix resin impregnation ratio is within a range of 35% to 95%. The invention also relates to a prepreg containing a reinforcing fiber substrate in the form of a sheet and formed from a reinforcing fiber woven fabric, and a matrix resin, wherein at least one surface of the reinforcing fiber substrate displays a sea-and-island-type pattern with resin-impregnated portions (island portions) and fiber portions (sea portions), such that a surface coverage of the matrix resin is within a range of 3% to 80%.

1 Claim, 4 Drawing Sheets

(56) References Cited

U.S. PATENT DOCUMENTS

| | | |
|---|---|---|
| 4,607,069 A | 8/1986 | Tesch et al. |
| 4,622,091 A | 11/1986 | Letterman |
| 4,808,639 A | 2/1989 | Chernack |
| 4,956,411 A | 9/1990 | Tada et al. |
| 4,957,801 A | 9/1990 | Maranci et al. |
| 5,100,935 A | 3/1992 | Iseler et al. |
| 5,279,893 A | 1/1994 | Hattori et al. |
| 5,589,523 A | 12/1996 | Sawaoka et al. |
| 5,597,631 A | 1/1997 | Furumoto et al. |
| 5,770,313 A | 6/1998 | Furumoto et al. |
| 5,911,932 A | 6/1999 | Dyksterhouse |
| 5,912,195 A | 6/1999 | Walla et al. |
| 6,045,898 A | 4/2000 | Kishi et al. |
| 6,114,000 A | 9/2000 | Muroi et al. |
| 6,133,167 A | 10/2000 | Green et al. |
| 6,139,942 A | 10/2000 | Hartness et al. |
| 6,391,436 B1 | 5/2002 | Xu et al. |
| 6,596,373 B1 | 7/2003 | Kishi et al. |
| 6,670,006 B1 | 12/2003 | Sugimori et al. |
| 2001/0030017 A1 | 10/2001 | Sato |
| 2002/0007022 A1 | 1/2002 | Oosedo et al. |
| 2002/0034624 A1 | 3/2002 | Harpell et al. |
| 2002/0037391 A1 | 3/2002 | Harpell et al. |
| 2002/0053400 A1 | 5/2002 | Lorenz et al. |
| 2003/0138602 A1 | 7/2003 | Lorenz et al. |
| 2006/0035088 A1 | 2/2006 | Takano et al. |
| 2006/0035548 A1 | 2/2006 | Goto et al. |
| 2008/0185753 A1 | 8/2008 | Takano et al. |
| 2008/0185757 A1 | 8/2008 | Takano et al. |
| 2008/0187718 A1 | 8/2008 | Takano et al. |

FOREIGN PATENT DOCUMENTS

| | | |
|---|---|---|
| BR | 9807657 | 2/2000 |
| CN | 1050698 | 4/1991 |
| CN | 1162526 | 10/1997 |
| CN | 1242792 | 1/2000 |
| CN | 1251597 | 4/2000 |
| DE | 31 20 459 A1 | 12/1982 |
| DE | 40 31 437 A1 | 4/1992 |
| DE | 20201902 | 8/2002 |
| EP | 0 144 939 A2 | 6/1985 |
| EP | 0 144 939 A3 | 6/1985 |
| EP | 0 312 993 A2 | 4/1989 |
| EP | 0 488 389 A2 | 6/1992 |
| EP | 0 541 795 A1 | 5/1993 |
| EP | 0 583 090 A1 | 2/1994 |
| EP | 0 909 845 A1 | 4/1999 |
| EP | 1 197 315 A2 | 4/2002 |
| EP | 1 419 875 A1 | 5/2004 |
| GB | 2364957 | 2/2002 |
| JP | 56-115216 | 9/1981 |
| JP | 60-38134 | 2/1985 |
| JP | 60-60136 | 4/1985 |
| JP | 1-200914 | 8/1989 |
| JP | 6-166765 | 6/1994 |
| JP | 8-66989 | 3/1996 |
| JP | 11-43546 | 2/1999 |
| JP | 2001-511827 | 8/2001 |
| JP | 2001-277239 | 10/2001 |
| JP | 2001-323046 | 11/2001 |
| JP | 2002-249605 | 9/2002 |
| JP | 2002-529274 | 9/2002 |
| JP | 2002-327076 | 11/2002 |
| JP | 2003-82117 | 3/2003 |
| JP | 2003-513110 | 4/2003 |
| JP | 2003-138041 | 5/2003 |
| JP | 2004-35604 | 2/2004 |
| KR | 2000-0070769 | 11/2000 |
| WO | WO 91/01621 | 2/1991 |
| WO | WO 98 34979 | 8/1998 |
| WO | WO 00 27632 | 5/2000 |
| WO | WO 00/48821 A1 | 8/2000 |
| WO | WO 00/58083 | 10/2000 |
| WO | WO 01 00405 | 1/2001 |
| WO | WO 02/28623 A1 | 4/2002 |
| WO | WO 03/004758 | 1/2003 |

OTHER PUBLICATIONS

Extended Search Report issued Jul. 16, 2013 in European Patent Application No. 10177309.1.
Extended Search Report issued Jul. 19, 2013 in European Patent Application No. 10177310.9.
Office Action issued Dec. 4, 2007 in JP 2002-210123 w/English translation.
Office Action issued May 6, 2010 in CN 200710180972.3 w/English translation.
Supplemental European Search Report issued Jul. 14, 2010 in EP03765331.8.
Definition of "staple fiber", Complete Textile Glossary, Celanese Acetate, 2001.
Partial European Search Report issued Dec. 9, 2011, in Patent Application No. 10177311.7.
Translation of P. Chen, and D. Wang, "Epoxy Resin and Application Thereof," Chemical Industry Press, pp. 51-59, Feb. 2004.
Notification Reexamination mailed Oct. 31, 2013, in co-pending CN Application No. 200710180973.8. (with partial translation).

PREPREG, INTERMEDIATE MATERIAL FOR FORMING FRP, AND METHOD FOR PRODUCTION THEREOF AND METHOD FOR PRODUCTION OF FIBER-REINFORCED COMPOSITE MATERIAL

TECHNICAL FIELD

The present invention relates to a prepreg that functions as an intermediate material for FRP molding.

BACKGROUND ART

Fiber-reinforced composite materials (hereafter also abbreviated as FRP) are lightweight, while offering good strength and high rigidity, and are consequently widely used in a variety of applications from sports and leisure through to industrial applications such as vehicles and aircraft. In recent years, with the fall in the cost of carbon fiber, the use of carbon fiber reinforced composite materials (hereafter abbreviated as CFRP), which are even more lightweight and offer even higher levels of strength and rigidity, within industrial applications has also become more widespread.

Amongst these potential industrial applications, CFRPs used for structural members within train bodies and aircraft frames are typically produced by autoclave molding, using an intermediate material known as a prepreg. The reason for this preference is that by conducting the molding under high pressure using an autoclave, not only can the occurrence of voids within the molded product be reduced, enabling the strength of the molded product to meet expectations, but the occurrence of surface pinholes can also be suppressed, enabling the production of a molded product with a favorable external appearance.

However, autoclave facilities are extremely expensive, which not only acts as a large barrier to new entrants, but also means that once autoclave facilities are purchased, the size of the molded products is restricted by the size of the autoclave, meaning the production of larger products is effectively impossible.

In order to avoid these problems, the development of autoclave-free, low cost molding is also progressing, and representative examples of such molding include oven molding under either vacuum conditions or normal atmospheric conditions (also known as vacuum bag molding). Oven molding does not require the application of pressure, meaning the molding can be conducted without the need for a proper pressure-resistant vessel such as an autoclave, and molding can be conducted simply with a furnace for raising the temperature. Molding can also be conducted with a simple device comprising an adiabatic board and a hot air heater. However, because these processes do not involve the application of pressure, residual voids tend to remain within the molded product, the strength of the molded product is inferior to that of a molded product produced in an autoclave, and pinhole formation is also a problem.

In recent years, a variety of measures for overcoming these problems have been proposed. For example, WO 00/27632 discloses technology relating to materials comprising a resin layer and a reinforcing fiber layer, which display minimal void generation, and enable the production of molded products with extremely clean surfaces, even when used with oven molding. However, with this technology, almost all of the resin is impregnated during molding, and depending on the molding conditions, portions of the resin that display unsatisfactory impregnation can occur, leading to the occurrence of internal voids and surface pinholes. Furthermore, because the surface is almost free from resin and is extremely dry, workability problems such as difficulty in bonding the product to the molding die can also be a concern.

DISCLOSURE OF INVENTION

An object of the present invention is to provide an intermediate material, which retains the level of workability associated with conventional prepregs, while enabling the production of a FRP with no internal voids or surface pinholes, but with excellent external appearance, using molding at only vacuum pressure, without the use of an autoclave.

A first aspect of the present invention is a prepreg comprising reinforcing fiber, a sheet-like reinforcing fiber substrate containing reinforcing fiber, and a matrix resin, wherein the matrix resin is impregnated into the sheet-like reinforcing fiber substrate and also covers one surface of the sheet-like reinforcing fiber substrate, and the matrix resin impregnation ratio is within a range of 35% to 95%.

Furthermore, a second aspect of the present invention is a prepreg comprising a matrix resin, and a sheet-like reinforcing fiber substrate, wherein the prepreg comprises reinforcing fiber, a sheet-like reinforcing fiber substrate containing reinforcing fiber, and a matrix resin, wherein the matrix resin exists on both surfaces of the sheet-like reinforcing fiber substrate, and the portion inside the sheet-like reinforcing fiber substrate into which the matrix resin has not been impregnated is continuous.

Furthermore, a third aspect of the present invention is a prepreg comprising a sheet-like reinforcing fiber substrate formed from a reinforcing fiber woven fabric, and a matrix resin, wherein at least one surface displays a sea-and-island-type pattern comprising resin-impregnated portions (island portions) where the matrix resin is present at the surface and fiber portions (sea portions) where the matrix resin is not present at the surface, the surface coverage ratio of the matrix resin on surfaces with the sea-and-island-type pattern is within a range of 3% to 80%, and the weave intersection coverage ratio for the island portions, as represented by a formula (I) below, is at least 40%.

$$\text{Island portions weave intersection coverage ratio } (\%) = (T/Y) \times 100 \quad (1)$$

(wherein, T represents the number of island portions that cover weave intersections, and Y represents the total number of weave intersections of the reinforcing fiber fabric on the surface with the sea-and-island-type pattern).

Furthermore, a fourth aspect of the present invention is an intermediate material for FRP molding comprising a prepreg containing reinforcing fiber and a matrix resin, and a substrate containing essentially no impregnated thermosetting resin composition, which is provided on at least one side of the prepreg, wherein the ratio (B)/(A) between the thickness (A) of the prepreg, and the thickness (B) of the substrate is within a range of 0.1 to 2.5.

Using the aspects described above, the level of workability associated with conventional prepregs can be retained, while FRP with no internal voids or surface pinholes, but with excellent external appearance can be produced using molding at only vacuum pressure, without the use of an autoclave.

BEST MODE FOR CARRYING OUT THE INVENTION

Figure 1:
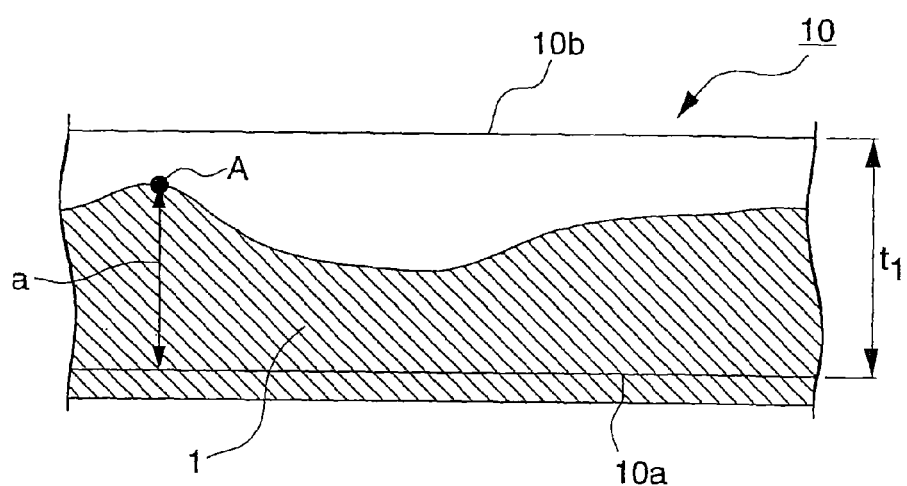
FIG. 1 is a schematic illustration of a prepreg that uses a sheet with the fibers aligned unidirectionally as the sheet-like reinforcing fiber substrate, viewed in a cross section cut perpendicularly to the direction of the fibers.

As follows is a description of the composition of the present invention.

A first embodiment of the present invention is a prepreg comprising a sheet-like reinforcing fiber substrate formed from reinforcing fiber that has been impregnated with a matrix resin, wherein only one surface of the sheet-like reinforcing fiber substrate is covered with the matrix resin, and the resin impregnation ratio is within a range of 35% to 95%. There are no particular restrictions on the fiber used in the sheet-like reinforcing fiber substrate used within this first embodiment of the present invention, and examples of suitable fibers include carbon fiber, glass fiber, aramid fiber, high-strength polyethylene fiber, boron fiber, and steel fiber. Carbon fiber is preferred as it results in more favorable properties for the generated FRP, particularly in terms of reduced weight and favorable mechanical properties such as high strength and high rigidity.

Furthermore, there are also no particular restrictions on the form of the sheet-like reinforcing fiber substrate used in the prepreg of this first embodiment, and suitable examples include plain weave fabric, twill fabric, satin weave fabric, stitched sheets such as non-crimped fabric (NCF) wherein fiber bundles are layered, either unidirectionally or at various angles, and then stitched to prevent the layers coming apart, as well as non-woven fabric, mats, and unidirectional materials in which a bundle of reinforcing fibers is aligned unidirectionally. Of these, woven fabrics and stitched sheets, which offer superior levels of handling, are preferred.

Furthermore, there are also no particular restrictions on the matrix resin used in the prepreg of the first embodiment, and either thermosetting resins or thermoplastic resins can be used, although from the viewpoints of the handling of the prepreg, such as the tack and drape characteristics, and the moldability, thermosetting resins are preferred. Examples of suitable thermosetting resins include epoxy resins, phenol resins, vinyl ester resins, unsaturated polyester resins, bismaleimide resins, BT resins, cyanate ester resins, and benzoxazine resins, although in terms of handling properties and the properties of the resulting cured product, epoxy resins, bismaleimide resins, BT resins, and cyanate ester resins are preferred, and of these, epoxy resins are particularly desirable.

A prepreg of the first embodiment is completely covered with resin on one surface, and the resin impregnation ratio must fall within a range of 35% to 95%. When molding is conducted without the use of an autoclave, under only vacuum pressure, the inclusion of a deaeratingdeaerating circuit is very important, although this requirement has already been well identified in the conventional technology. In this description, the deaeratingdeaerating circuit refers to the portions within the prepreg that have not been impregnated with resin, and these portions act as air pathways. However, if this deaeratingdeaerating circuit is too large, then the deaeratingdeaerating circuit can remain even after molding, and can cause internal voids and surface pinholes. As a result of investigating the most appropriate size for the deaeratingdeaerating circuit in a prepreg, the inventors of the present invention discovered that provided the resin impregnation ratio falls within a certain preferred range, a satisfactory deaerating circuit can be ensured, while satisfactory resin impregnation can still be achieved during molding, and they were consequently able to complete the present invention.

This resin impregnation ratio is described below in more detail with reference to the drawings. FIG. 1 is a schematic illustration of a prepreg 10 with a reinforcing fiber substrate in which the fibers are aligned unidirectionally, viewed in a cross section cut perpendicularly to the direction of the fibers. The matrix resin is supplied from underneath in FIG. 1, and the matrix resin 1 impregnates upwards into the sheet-like reinforcing fiber substrate. In FIG. 1, the portion into which the matrix resin 1 has impregnated is shown by the diagonal shading. In FIG. 1, the matrix resin is supplied from underneath, but in the present invention, the matrix resin can also be supplied from above, and then allowed to impregnate down into the substrate. The cross section is inspected across at least 80% of the width of the sheet-like reinforcing fiber substrate, and the highest point to which the resin has penetrated is determined (or in those cases where the resin is supplied from above, the lowest point of penetration is determined). In FIG. 1, the point A represents the highest point for the resin. If the average thickness of the sheet-like reinforcing fiber substrate is termed $t_1$, and the distance from the bottom edge of the sheet-like reinforcing fiber substrate to the point A is termed a, then the impregnation ratio can be represented by a formula (3) shown below.

$$\text{Resin impregnation ratio} = a/t_1 \times 100(\%) \quad (3)$$

The average thickness $t_1$ of the sheet-like reinforcing fiber substrate can be determined in the manner described below. The length of the line joining the bottom edge 10a and the top edge 10b in a cross section through the prepreg 10 (this line is deemed the thickness line) is taken as the thickness of the sheet-like substrate. This thickness is measured at 10 random points, and the average of the thickness values is calculated and used as the average thickness $t_1$ of the sheet-like reinforcing fiber substrate. In the case of a sheet-like reinforcing fiber substrate in which the fibers are aligned unidirectionally, the outer contours of the substrate essentially coincide with the thickness line.

Furthermore, in order to determine the highest point reached by the matrix resin 1, the substrate is best viewed in a cross section perpendicular to the direction of the reinforcing fibers, and consequently in the case of a multiaxial stitched sheet, wherein unlike the sheet-like reinforcing fiber substrate of the FIG. 1 in which the fibers are aligned unidirectionally, the fibers are layered in all different directions, a cross sectional photograph can be taken through a cross section at any suitable angle.

The cut can be performed with a sharp blade such as a razor blade, and is made with a single cut. The photograph is preferably taken at a magnification of 50 to 100×.

Figure 2:
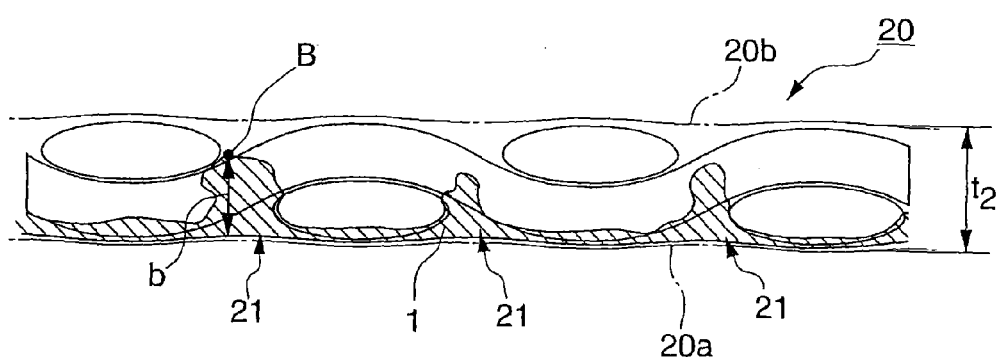
FIG. 2 is a schematic illustration of a prepreg that uses a plain weave fabric as the sheet-like reinforcing fiber substrate, viewed in a cross section cut perpendicularly to the warp.

Next is a description of a case in which the sheet-like reinforcing fiber substrate is a woven fabric 20. FIG. 2 shows a method of determining the resin impregnation ratio in those cases where a plain weave fabric is used as the sheet-like reinforcing fiber substrate. In the case of a woven fabric, the matrix resin 1 moves along the open portions 21 in the weave, meaning the resin impregnation ratio is best observed at a cross-section through those open portions 21. In a similar manner to that described for the reinforcing fiber substrate in the FIG. 1 where the fibers were aligned unidirectionally, the highest point B to which the matrix resin 1 has penetrated is determined from the cross section of FIG. 2. If the distance from the bottom edge 20a of the sheet-like reinforcing fiber substrate to the point B is termed b, the length of the line joining the bottom edge 20a and the top edge 20b of the sheet-like reinforcing fiber substrate is deemed the thickness of the sheet-like reinforcing fiber substrate, and the average thickness is termed $t_2$, then the resin impregnation ratio can be determined by a formula (4) shown below. The average thickness $t_2$ is measured using a similar method to that described for the case of a reinforcing fiber substrate in which the fibers are aligned unidirectionally, although in the case of a woven fabric, the outer contours of the sheet-like reinforcing fiber substrate do not coincide with the thickness line (see FIG. 2).

$$\text{Resin impregnation ratio} = b/t_2 \times 100(\%) \quad (4)$$

The resin impregnation ratio in a prepreg according to the first embodiment is preferably within a range of 35% to 95%. If the resin impregnation ratio is less than 35%, then the resin is unable to completely fill the non-impregnated portions during molding, meaning internal voids and surface pinholes remain following molding. If the resin impregnation ratio is at least 40%, then internal voids and surface pinholes tend not to remain following molding, and ratios of at least 50% are particularly preferred. In contrast, if the resin impregnation ratio exceeds 95%, then the formation of a deaerating circuit can no longer be ensured, which can also cause residual internal voids and surface pinholes. If the resin impregnation ratio is no more than 90%, then it is easier to ensure an adequate deaerating circuit, and resin impregnation ratios of no more than 80% are particularly preferred.

Furthermore, a prepreg of the present invention must have at least one surface completely covered with resin. The prepreg is used either by sticking to a molding die, or by generating a multi-ply laminate of the prepreg, and consequently the prepreg requires a suitable level of tackiness. A prepreg of the present invention has at least one surface completely covered with resin, and consequently has a suitable level of tackiness and superior handling properties.

Furthermore, the weight of the sheet-like reinforcing fiber substrate in a prepreg according to the first embodiment is preferably at least 400 g/m². A prepreg of the first embodiment contains a deaerating circuit, but during molding the resin penetrates to all corners of the sheet-like reinforcing fiber substrate, enabling the formation of a completely impregnated molded product with no internal voids or surface pinholes, and consequently the prepreg is suited to sheet-like reinforcing fiber substrate with a certain level of thickness. In terms of weight, sheet-like reinforcing fiber substrates with a weight of at least 400 g/m² are preferred. Weights of at least 600 g/m² are even more desirable, and weights of at least 700 g/m² are particularly preferred.

Furthermore, the thickness of the sheet-like reinforcing fiber substrate in a prepreg of the first embodiment is preferably at least 200 µm. A prepreg of the first embodiment can yield a favorable molded product with no internal voids at atmospheric pressure, even if the fluidity of the matrix resin is poor. Accordingly, a favorable molded product can be achieved even if the sheet-like reinforcing fiber substrate is considerably thick, and in actual fact, the effects of the present invention are manifested most markedly with thicker substrates. The effects are particularly marked for thick materials where the thickness of the sheet-like reinforcing fiber substrate is at least 300 µm. The thickness is determined by dividing the mass per unit of surface area of the sheet-like reinforcing fiber substrate by the density of the reinforcing fibers.

In those cases where the matrix resin of a prepreg of the first embodiment is a thermosetting resin composition, the thermosetting resin composition preferably comprises a thermoplastic resin that is not dissolved within the thermosetting resin composition. This thermoplastic resin is preferably in the form of short fibers, and the length of those short fibers is preferably within a range of 1 to 50 mm. Furthermore, the size of the fibers is preferably no more than 300 tex.

When prepregs of this first embodiment are laminated and molded, then during the molding process, the short fibers of thermoplastic resin within the thermosetting resin composition are filtered by the reinforcing fibers that make up the sheet-like reinforcing fiber substrate, and end up positioned at the surface of each of the laminated sheet-like reinforcing fiber substrates, namely, positioned between the layers of the laminate. This improves the interlayer peeling resistance markedly, providing a superior interlayer reinforcement effect.

In order to ensure an efficient manifestation of this interlayer reinforcement effect, the thermoplastic resin preferably exist as fibers. If other shapes such as fine particles are used instead of the aforementioned short fibers, then the thermoplastic resin is not efficiently filtered by the sheet-like reinforcing fiber substrate during the molding process, and migrates into the interior of the sheet-like reinforcing fiber substrate together with the thermosetting resin during the impregnation process, meaning efficient interlayer reinforcement can not be achieved.

Accordingly, the thermoplastic resin is preferably in the form of short fibers. In addition, the length of these fibers is preferably within a range of 1 to 50 mm. If the length of the short fibers is less than 1 mm, then the fibers penetrate into the interior of the sheet-like reinforcing fiber substrate, in a similar manner to fine particles, making it difficult to achieve an efficient improvement in the interlayer peeling resistance. Considering the fact that a certain size is necessary, fibers with a length of at least 3 mm are particularly preferred. In contrast, if the length of the fibers exceeds 50 mm, then the fibers become overly long, preparation of the thermosetting resin composition becomes extremely problematic, and dispersing the fibers uniformly through the thermosetting resin composition also becomes difficult, which causes an undesirable deterioration in the uniformity of the interlayer reinforcement. Fiber lengths of no more than 30 mm are particularly preferred.

Furthermore in those cases where the thermoplastic resin exists as short fibers, the size of those fibers is preferably no more than 300 tex. The short fibers of the thermoplastic resin may exist either as filaments formed from single strands of fiber, or as multifilaments comprising a plurality of individual fiber strands. If the size of the fibers exceed 300 tex, then the thickness of the layer formed by the accumulated short fibers between the substrate layers becomes overly thick, and there is a danger of the short fibers interfering with the reinforcing fibers of the sheet-like reinforcing fiber substrates, causing bending of the reinforcing fibers, and an undesirable deterioration in the mechanical strength of the molded composite material. Fiber sizes of no more than 100 tex are even more desirable, and sizes of no more than 50 tex are particularly preferred. There are no particular restrictions at the fine end of the size scale, and satisfactory effects can be achieved for sizes of at least 1 tex.

Examples of suitable thermoplastic resins include polyaramid, polyester, polyacetal, polycarbonate, polyphenylene oxide, polyphenylene sulfide, polyallylate, polyimide, polyetherimide, polysulfone, polyamide, polyamide-imide, and polyetheretherketone. Furthermore, elastomers can also be used favorably instead of the thermoplastic resin. Examples of suitable elastomers include synthetic rubbers such as butyl rubber, isoprene rubber, nitrile rubber, and silicon rubber, as well as natural rubbers such as latex.

The quantity of the thermoplastic resin within the thermosetting resin composition is preferably within a range of 1 to 100 parts by mass per 100 parts by mass of the thermosetting resin composition. If the quantity of the thermoplastic resin is less than 1 part by mass, then the effect of the invention in improving the FRP interlayer peeling resistance weakens undesirably. Quantities of the thermoplastic resin of at least 5 parts by mass are even more desirable, and quantities of at least 10 parts by mass are particularly preferred. In contrast, if the quantity exceeds 100 parts by mass, then the proportion of the thermoplastic resin becomes overly high, which can cause a deterioration in the impregnation of the matrix resin into the sheet-like reinforcing fiber substrate, and the quantity of the matrix resin relative to the sheet-like reinforcing fiber substrate can become too high, causing an undesirable deterioration in the FRP mechanical strength.

Although there are no particular restrictions on the process for producing a prepreg according to the first embodiment, a production process in which a resin is supplied, using a hot melt method, to one surface of a sheet-like reinforcing fiber substrate comprising reinforcing fibers, and the structure is then heating and pressed, causing the resin to migrate through to a position close to the opposite surface of the substrate is preferred. In such a process, the heating temperature and the pressure applied during the pressing step are adjusted to control the degree of migration of the resin and the manner of the migration, thus adjusting the resin impregnation ratio to a value within a range of 35% to 95%. The hot melt method is a prepreg production process in which no solvent is used, and the viscosity of the resin is lowered by raising the temperature of the resin, thereby causing the resin to impregnate the substrate, and amongst the possible forms of the hot melt method that can be used for producing a prepreg, a double film process, in which the resin is supplied from both the upper and lower surfaces of the sheet-like reinforcing fiber substrate is usually preferred in terms of the impregnation results. However, in the first embodiment, because one surface of the prepreg must be available for forming the deaerating circuit and can therefore not be impregnated with resin, the double film process is not suitable as the process for producing a prepreg according to the first embodiment. As described above, a single film process in which the resin is supplied from one surface of the sheet-like reinforcing fiber substrate is preferred.

The matrix resin in a prepreg of the first embodiment is a thermosetting resin composition, and in those cases where the composition also comprises a thermoplastic resin that has not been dissolved in the thermosetting resin composition, the thermoplastic resin is preferably blended into the composition during the mixing and preparation of the thermosetting resin composition, and the resulting composition is then converted to a film form, and impregnated into the sheet-like reinforcing fiber substrate.

A second embodiment of the present invention is a prepreg comprising a sheet-like reinforcing fiber substrate and a matrix resin, wherein the matrix resin exists on both surfaces of the sheet-like reinforcing fiber substrate, and the portion inside the sheet-like reinforcing fiber substrate into which the matrix resin has not been impregnated is continuous.

There are no particular restrictions on the reinforcing fibers used in the sheet-like reinforcing fiber substrate used in a prepreg of this second embodiment, and examples of suitable fibers include carbon fiber, graphite fiber, aramid fiber, silicon carbide fiber, alumina fiber, boron fiber, high-strength polyethylene fiber, PBO fiber, and glass fiber, and these fibers can be used either singularly, or in mixtures of two or more different types of fiber. Of these reinforcing fibers, either carbon fiber which offers superior specific strength and inelasticity, or glass fiber which offers more favorable cost performance, is preferred.

Furthermore, there are also no particular restrictions on the form of the sheet-like reinforcing fiber substrate used in the prepreg of this second embodiment, and suitable examples include unidirectional materials in which the reinforcing fibers are aligned unidirectionally, woven fabrics, knit fabrics, braided fabrics, stitched sheets wherein multiple fabrics are laminated, either unidirectionally or in various directions, and then stitched, as well as mats and non-woven fabrics comprising short fibers. Of these, woven fabrics, stitched sheets, mats and non-woven fabrics offer superior levels of stability for the sheet-like reinforcing fiber substrate, and because an intermediate material for FRP molding of the present invention offers superior handling properties, it is preferred as the sheet-like reinforcing fiber substrate.

In a prepreg according to the second embodiment, the portion inside the sheet-like reinforcing fiber substrate into which the matrix resin has not been impregnated must be a continuous portion. In the second embodiment, this non-impregnated portion functions as the deaerating circuit, and the existence of this deaerating circuit means that the molded FRP can be formed without internal voids and surface pinholes. However, if this deaerating circuit is segmented by the matrix resin, then the air that is enclosed by the matrix resin becomes extremely difficult to remove, and can give rise to internal voids and surface pinholes.

The following method can be used for determining whether or not the portion inside the sheet-like reinforcing fiber substrate into which the matrix resin has not been impregnated is continuous. First, the prepreg is cut at a right angle to the lengthwise direction of the prepreg. The cut is performed in a single action, using an NT cutter or the like. If a number of cutting strokes are used, then the surface of the cut becomes undesirably messy. The two edges of the cut surface in the width direction are trimmed off, with 10% of the width dimension removed from each edge. The entirety of the remaining 80% portion across the width direction is then inspected to confirm that the portion into which the matrix resin has not been impregnated is continuous. The inspection is preferably conducted using a magnifying glass or the like.

Figure 3:
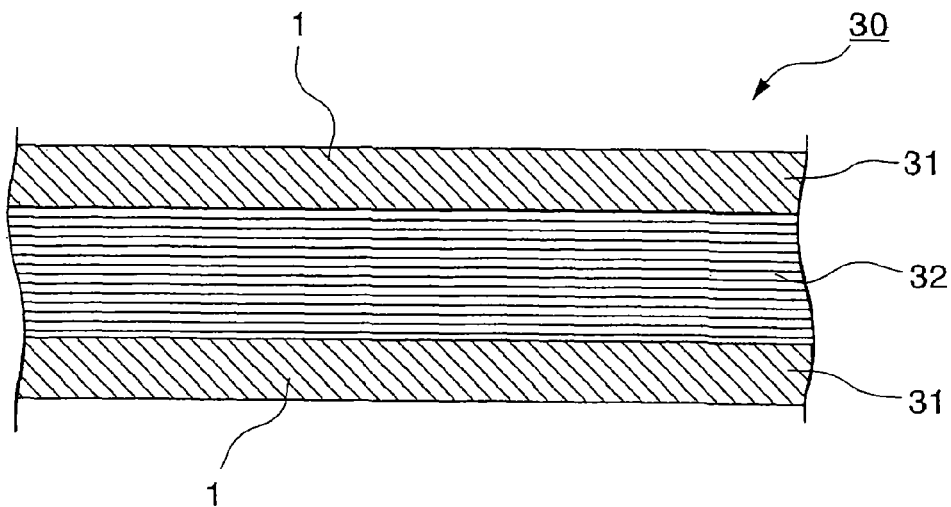
FIG. 3 is a schematic illustration showing one example of a prepreg according to a second embodiment of the present invention.

FIG. 3 shows a prepreg 30 formed from a sheet-like reinforcing fiber substrate comprising matrix resin-impregnated layers 31 that have been impregnated with a matrix resin 1, and a matrix resin non-impregnated layer 32. This figure represents an example where, when the matrix resin 1 is impregnated, the matrix resin non-impregnated layer 32 is formed as a continuous layer.

Figure 5:
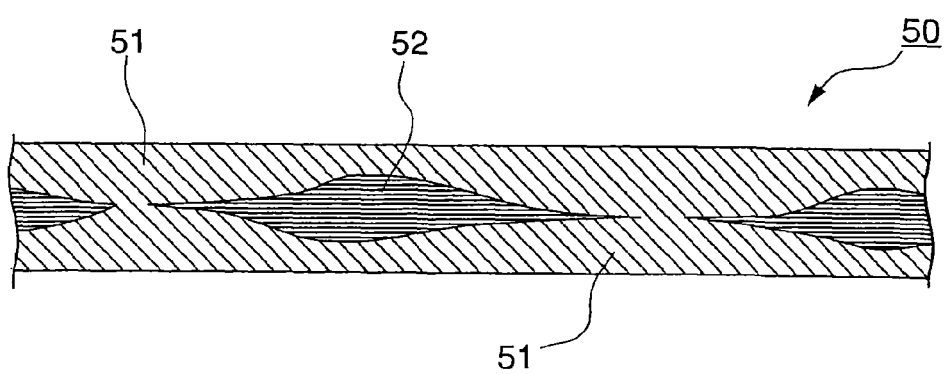
FIG. 5 is a schematic illustration of a prepreg of another comparative example, wherein although the matrix resin has been supplied from both sides, portions that have not been impregnated with the matrix resin do not exist in a continuous state.

In contrast, FIG. 5 shows a prepreg 50 formed from a sheet-like reinforcing fiber substrate comprising matrix resin-impregnated layers 51 that have been impregnated with a matrix resin 1, and a matrix resin non-impregnated layer 52. This figure represents an example where, when the matrix resin 1 is impregnated, the matrix resin non-impregnated layer 52 is formed in a non-continuous manner.

There are no particular restrictions on the matrix resin used in a prepreg of the second embodiment, and both thermosetting resins and thermoplastic resins can be used, although from the viewpoints of the handling of the prepreg, such as the tack and drape characteristics, and the moldability, thermosetting resins are preferred. Examples of suitable thermosetting resins include epoxy resins, phenol resins, vinyl ester resins, unsaturated polyester resins, bismaleimide resins, BT resins, cyanate ester resins, and benzoxazine resins. In terms of handling properties and the properties of the resulting cured product, epoxy resins, bismaleimide resins, BT resins, and cyanate ester resins are preferred, and of these, epoxy resins are particularly desirable.

Furthermore, the weight of the sheet-like reinforcing fiber substrate in a prepreg according to the second embodiment is preferably at least 400 g/m². A prepreg of the second embodiment contains a deaerating circuit, but during molding the resin penetrates to all corners of the sheet-like reinforcing fiber substrate, enabling the formation of a completely impregnated molded product with no internal voids or surface pinholes. Consequently the prepreg is suited to sheet-like reinforcing fiber substrate with a certain level of thickness. In terms of weight, sheet-like reinforcing fiber substrates with a weight of at least 200 g/m² are preferred. Weights of at least 600 g/m² are even more desirable, and weights of at least 700 g/m² are particularly preferred.

Furthermore, the thickness of the sheet-like reinforcing fiber substrate in a prepreg of the second embodiment is preferably at least 200 p.m. A prepreg of the second embodiment can yield a favorable molded product with no internal voids at atmospheric pressure, even if the fluidity of the matrix resin is poor. Accordingly, a favorable molded product can be achieved even if the sheet-like reinforcing fiber substrate is considerably thick, and in actual fact, the effects of the present invention are manifested most markedly with thicker substrates. The effects are particularly marked for thick materials where the thickness of the sheet-like reinforcing fiber substrate is at least 300 μm. The thickness is determined by dividing the mass per unit of surface area of the sheet-like reinforcing fiber substrate by the density of the reinforcing fibers.

In those cases where the matrix resin of a prepreg of the second embodiment is a thermosetting resin composition, the thermosetting resin composition preferably comprises a thermoplastic resin that is not dissolved within the thermosetting resin composition. This thermoplastic resin is preferably in the form of short fibers, and the length of those short fibers is preferably within a range of 1 to 50 mm. Furthermore, the size of the fibers is preferably no more than 300 tex.

When prepregs of this second embodiment are layered and molded, then during the molding process, the short fibers of thermoplastic resin within the thermosetting resin composition are filtered by the reinforcing fibers that make up the sheet-like reinforcing fiber substrate, and end up positioned at the surface of each of the laminated sheet-like reinforcing fiber substrates, namely, positioned between the layers of the laminate. This improves the interlayer peeling resistance markedly, providing a superior interlayer reinforcement effect.

In order to ensure an efficient manifestation of this interlayer reinforcement effect, the thermoplastic resin preferably exist as fibers. If other shapes such as fine particles are used instead of these thermoplastic resin short fibers, then the thermoplastic resin is not efficiently filtered by the sheet-like reinforcing fiber substrate during the molding process, and migrates into the interior of the sheet-like reinforcing fiber substrate together with the thermosetting resin during the impregnation process, meaning efficient interlayer reinforcement can not be achieved.

Accordingly, the thermoplastic resin is preferably in the form of short fibers. In addition, the length of these fibers is preferably within a range of 1 to 50 mm. If the length of the short fibers is less than 1 mm, then the fibers penetrate into the interior of the sheet-like reinforcing fiber substrate, in a similar manner to fine particles, making it difficult to achieve an efficient improvement in the interlayer peeling resistance. Considering the fact that a certain size is necessary, fibers with a length of at least 3 mm are particularly preferred. In contrast, if the length of the fibers exceeds 50 mm, then the fibers become overly long, preparation of the thermosetting resin composition becomes extremely problematic, and dispersing the fibers uniformly through the thermosetting resin composition also becomes difficult, which causes an undesirable deterioration in the uniformity of the interlayer reinforcement. Fiber lengths of no more than 30 mm are particularly preferred.

Furthermore, in those cases where the thermoplastic resin exists as short fibers, the size of those fibers is preferably no more than 300 tex. The short fibers of the thermoplastic resin may exist either as filaments formed from single strands of fiber, or as multifilaments comprising a plurality of individual fiber strands. If the size of the fibers exceed 300 tex, then the thickness of the layer formed by the accumulated short fibers between the substrate layers becomes overly thick, and there is a danger of the short fibers interfering with the reinforcing fibers of the sheet-like reinforcing fiber substrates, causing bending of the reinforcing fibers, and an undesirable deterioration in the mechanical strength of the molded composite material. Single fiber sizes of no more than 100 tex are even more desirable, and sizes of no more than 50 tex are particularly preferred. There are no particular restrictions at the fine end of the single fiber size scale, and satisfactory effects can be achieved for sizes of at least 1 tex.

Examples of suitable thermoplastic resins include polyaramid, polyester, polyacetal, polycarbonate, polyphenylene oxide, polyphneylene sulfide, polyallylate, polyimide, polyetherimide, polysulfone, polyamide, polyamide-imide, and polyetheretherketone. Furthermore, elastomers can also be used favorably instead of the thermoplastic resin. Examples of suitable elastomers include synthetic rubbers such as butyl rubber, isoprene rubber, nitrile rubber, and silicon rubber, as well as natural rubbers such as latex.

The quantity of the thermoplastic resin within the thermosetting resin composition is preferably within a range of 1 to 100 parts by mass per 100 parts by mass of the thermosetting resin composition. If the quantity of the thermoplastic resin is less than 1 part by mass, then the effect of the invention in improving the FRP interlayer peel resistance weakens undesirably. Quantities of at least 5 parts by mass are even more desirable, and quantities of at least 10 parts by mass are particularly preferred. In contrast, if the quantity exceeds 100 parts by mass, then the proportion of the thermoplastic resin becomes overly high, which can cause a deterioration in the impregnation of the matrix resin into the sheet-like reinforcing fiber substrate, and the quantity of the matrix resin relative to the sheet-like reinforcing fiber substrate can become too high, causing an undesirable deterioration in the FRP mechanical strength.

In those cases where the matrix resin used in a prepreg of the second embodiment is a thermosetting resin composition, the thermosetting resin composition is preferably able to be cured at 90° C. for 2 hours, and even more preferably at 80° C. for 2 hours. A prepreg of the second embodiment can yield a favorable molded product with no internal voids at atmospheric pressure, even if the fluidity of the thermosetting resin composition that functions as the matrix resin is poor, and consequently, the invention is suited to comparatively low temperature curing of the thermosetting resin composition.

On the other hand, prepregs must typically display favorable handling characteristics at room temperature. Two major factors in determining the handling characteristics are the tack (the degree of stickiness) and the drape characteristics (the flexibility), and in order to optimize the tack and drape characteristics, the thermosetting resin composition that functions as the matrix resin must have a viscosity that falls within a certain range. If the viscosity of the thermosetting resin composition is too low, then the tackiness is too powerful, making handling extremely difficult, whereas if the viscosity is too high, then the tackiness is overly weak, and the drape characteristics can effectively disappear, which also makes handling very difficult. Hence, in order to ensure favorable handling characteristics for the prepreg, the thermosetting resin composition must have a viscosity that falls within an appropriate range. Accordingly, if a thermosetting resin composition cures at lower temperatures, then this means that the composition is capable of curing while still at a relatively higher viscosity, and is consequently suitable as a thermosetting resin composition for a prepreg of the second embodiment, which is capable of yielding a favorable molded product even with comparatively poor fluidity.

A determination as to whether or not the thermosetting resin composition can be cured in 2 hours at 90° C. can be performed in the following manner. Namely, either the thermosetting resin composition by itself, or a sheet-like reinforcing fiber substrate that has been impregnated with the thermosetting resin composition is molded for 2 hours at 90° C. in an oven. If the external appearance suggests that the resulting cured product has definitely cured, then the composition is deemed to be curable in 2 hours at 90° C. A determination as to whether or not a thermosetting resin composition can be cured in 2 hours at 80° C. can be conducted in a similar manner. In those cases where determining whether or not the composition has cured is difficult, the Tg value of the molded product is measured, and the composition is deemed to have cured if the Tg value is at least 30° C.

Figure 4:
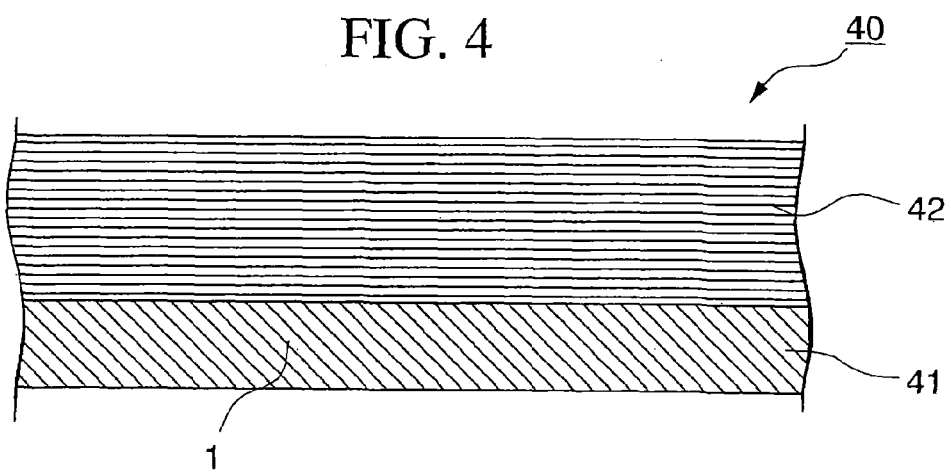
FIG. 4 is a schematic illustration of a prepreg of a comparative example, wherein the matrix resin has been supplied from one surface.

Typically, when an intermediate material for FRP molding such as a prepreg is produced, the process for impregnating the matrix resin into the sheet-like reinforcing fiber substrate involves applying a thin coating of a thermosetting resin composition on the surface of a release sheet or a polyolefin film or the like, and then supplying the thermosetting resin composition on the surface of a reinforcing fiber substrate to achieve impregnation. These impregnation processes can be broadly classified into single film processes in which the resin composition is supplied and impregnated from only one surface of the reinforcing fiber substrate, and double film processes in which the resin composition is supplied and impregnated from both surfaces of the reinforcing fiber substrate. In the second embodiment, supply of the resin composition using a double film process is extremely desirable. The reason for this preference is that the second embodiment assumes the use of thermosetting resin compositions that are capable of curing at low temperatures, namely, thermosetting resin compositions with comparatively low fluidity. FIG. 3 and FIG. 4 are schematic illustrations showing the prepregs obtained when the same quantity of resin is supplied to sheet-like reinforcing fiber substrates of identical thickness, using a double film process and a single film process respectively.

FIG. 3 shows a prepreg 30 comprising matrix resin-impregnated layers 31 and a matrix resin non-impregnated layer 32, formed by impregnating a matrix resin 1 from both surfaces of a sheet-like reinforcing fiber substrate.

FIG. 4 shows a prepreg 40 comprising a matrix resin-impregnated layer 41 and a matrix resin non-impregnated layer 42, formed by impregnating a matrix resin 1 from one surface of a sheet-like reinforcing fiber substrate.

As is evident from FIG. 3 and FIG. 4, if prepregs of the second embodiment are produced by either a single film process or a double film process, then the prepreg produced by the double film process tends to have a wider non-impregnated layer 42 than the prepreg produced by the single film process. As a result, using a double film process is preferred, as it enables a reduction in the quantity of thermosetting resin composition that must migrate in order to fill the deaerating circuit during the molding step, thus ensuring that the deaerating circuit is completely filled prior to the completion of curing.

When the matrix resin is supplied to the sheet-like reinforcing fiber substrate, it is preferably stuck to the substrate at room temperature, without heating. However, in those cases where the viscosity of the matrix resin at room temperature is very high, the resin may be heated slightly to improve the level of fluidity. However even in such cases, in order to ensure that a continuous resin non-impregnated portion such as that described below is left inside the substrate, any heating is preferably conducted at no more than 40° C., and even more preferably at no more than 30° C.

In those cases where the matrix resin for a prepreg according to the second embodiment is a thermosetting resin composition, and that composition comprises a thermoplastic resin that is not dissolved within the thermosetting resin composition, the thermoplastic resin is preferably blended into the composition during the mixing and preparation of the thermosetting resin composition, and the resulting composition is then converted to a film form, and impregnated into the sheet-like reinforcing fiber substrate.

A prepreg according to a third embodiment of the present invention comprises a matrix resin impregnated into a reinforcing fiber woven fabric, wherein at least one surface displays a sea-and-island-type pattern comprising resin-impregnated portions (island portions) where the matrix resin is present at the surface and fiber portions (sea portions) where the matrix resin is not present at the surface, the surface coverage ratio of the matrix resin on surfaces with the sea-and-island-type pattern is within a range of 3% to 80%, and the weave intersection coverage ratio for the island portions, as represented by a formula (5) shown below, is at least 40%.

Island portions weave intersection coverage ratio $(\%)=(T/Y)\times 100$ (5)

(wherein, T represents the number of island portions that cover weave intersections, and Y represents the total number of weave intersections of the reinforcing fiber fabric on the surface with the sea-and-island-type pattern).

A prepreg of the third embodiment is formed by impregnating a reinforcing fiber woven fabric with a matrix resin. Suitable examples of the reinforcing fibers used in forming the woven fabric include carbon fiber, glass fiber, aramid fiber, boron fiber, metal fiber, PBO fiber, and high-strength polyethylene fiber, although of these, carbon fiber is particularly preferred as it results in more favorable mechanical properties following molding, and is also very lightweight. Furthermore, suitable examples of the form of the woven fabric include plain weave fabric, twill fabric, satin weave fabric, stitched sheets in which long fibers that have been aligned unidirectionally are stitched together, and blind weave. Woven fabrics in which the warp and the woof use different fibers can also be used.

Furthermore, a reinforcing fiber woven fabric used in the third embodiment preferably displays a fiber weight of no more than 1500 g/m². If the fiber weight exceeds 1500 g/m², then the density of the reinforcing fibers becomes overly high, and achieving a fabric with superior mechanical properties becomes difficult. Fiber weights of no more than 1000 g/m² are even more desirable. There are no particular restrictions on the lower limit for the fiber weight. However, the weight is preferably at least 50 g/m², and even more preferably 75 g/m² or greater. If the fiber weight is less than 50 g/m², then in those cases where a large FRP is required, the number of layers of prepreg must be increased significantly, which can lead to cost increases.

There are no particular restrictions on the matrix resins that can be used in a prepreg according to the third embodiment, and suitable resins include thermosetting resins such as epoxy resins, polyester resins, vinyl ester resins, phenol resins, maleimide resins, polyimide resins, and BT resins comprising a combination of a cyanate and a bismaleimide resin, as well as thermoplastic resins such as acrylic resins and polyetheretherketones. Matrix resins that improve the strength of the product FRP are preferred, and of the above resins, epoxy resins are particularly preferred, as their superior adhesion to reinforcing fibers improves the mechanical properties of the product FRP.

Specific examples of suitable epoxy resins include bifunctional resins such as bisphenol A epoxy resins, bisphenol F epoxy resins, bisphenol S epoxy resins, biphenyl epoxy resins, naphthalene epoxy resins, dicyclopentadiene epoxy resins, fluorene epoxy resins, and modified resins thereof; and trifunctional or greater polyfunctional epoxy resins such as phenol novolac epoxy resins, cresol epoxy resins, glycidylamine epoxy resins such as tetraglycidyldiaminodiphenylmethane, triglycidylaminophenol and tetraglycidylamine, glycidyl ether epoxy resins such as tetrakis(glycidyloxyphenyl)ethane and tris(glycidyloxymethane), as well as modified resins thereof; and combinations of one or more of the above resins can also be used as the matrix resin.

The above epoxy resin compositions may also contain curing agents such as diphenylmethane, diaminodiphenylsulfone, aliphatic amines, imidazole derivatives, dicyandiamide, tetramethylguanidine, thiourea adducts of amines, carboxylic acid hydrazides, carboxylic acid amides, polyphenol compounds, polymercaptans, and boron trifluoride ethyl amine complex, or materials obtained by preliminary reaction between an epoxy resin and a portion of one of the above curing agents. In addition, by also blending in a curing catalyst such as 3-(3,4-dichlorophenyl)-1,1-dimethylurea or phenyldimethylurea, the curing time can be shortened, thereby shortening the molding time.

In addition, in those cases where the matrix resin in the third embodiment is a thermosetting resin composition, the minimum viscosity for the thermosetting resin composition is preferably no more than 1000 poise. If a high-viscosity thermosetting resin composition with a minimum viscosity exceeding 1000 poise is used, then the fluidity of the thermosetting resin composition deteriorates. In a prepreg of the third embodiment, the thermosetting resin composition fills the deaerating circuit, which has been complete the role, during molding, but if the fluidity of the thermosetting resin composition is poor, then the molding process may finish before this filling step is complete, meaning there is a danger that any portions of residual deaerating circuit will form internal voids. In order to prevent this occurring, the weight of the resin must be increased, resulting in an undesirable increase in cost. Accordingly, lower minimum viscosity values are preferred, and values of no more than 500 poise are particularly desirable.

In the third embodiment, the minimum viscosity refers to the lowest viscosity value observed when the temperature of the thermosetting resin is raised from room temperature at a rate of 5° C./minute. The minimum viscosity of the thermosetting resin composition can be determined by measuring the dynamic viscoelasticity of the composition, while the temperature is raised from room temperature at a rate of 5° C./minute.

In a prepreg of the third embodiment, at least one surface displays a sea-and-island-type pattern comprising resin-impregnated portions (island portions) where the resin composition is present at the surface and fiber portions (sea portions) where the resin composition is not present at the surface, and the surface coverage ratio of the resin on surfaces with the sea-and-island-type pattern is within a range of 3% to 80%.

Figure 6:
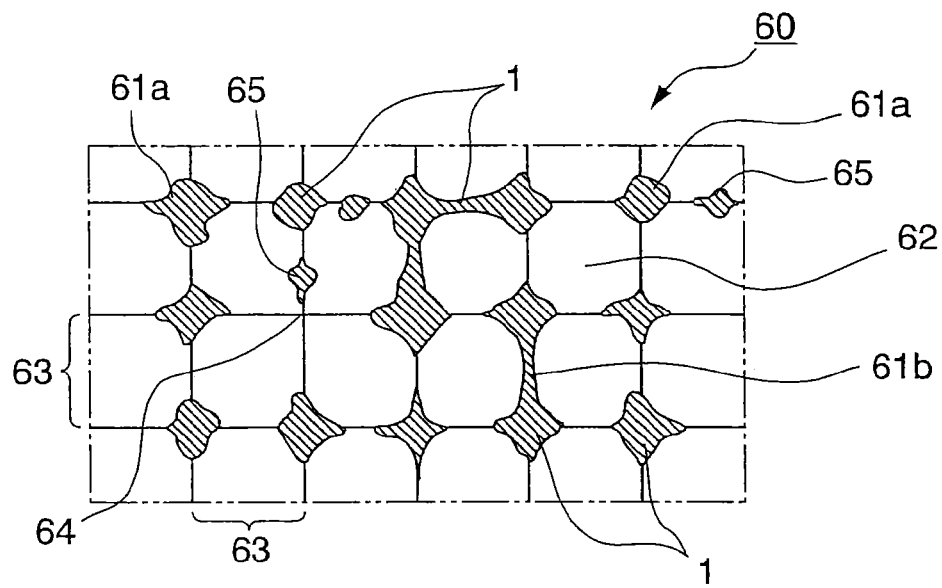
FIG. 6 is a schematic illustration showing the surface of a prepreg according to a third embodiment of the present invention.

First is a description of the sea-and-island-type pattern, with reference to the drawings. FIG. 6 is a schematic illustration showing the surface of a prepreg according to a third embodiment of the present invention, wherein a resin composition has been impregnated into one surface of a plain weave reinforcing fiber woven fabric to form a sea-and-island-type pattern. The surface of the woven fabric 60 produced from woven reinforcing fibers comprises island portions 61 and sea portions 62. Of the island portions 61, those that exist in isolation at a single weave intersection 64 are labeled as island portions 61a, and those that are linked with adjacent island portions are labeled as island portions 61b. By forming the island portions 61 in this type of scattered arrangement across the surface, the sea portions 62 act as the deaerating circuit during molding of the prepreg. The spacing between adjacent weave intersections 64 is labeled as the distance 63.

In a prepreg of the third embodiment, the surface coverage ratio of the resin on those surfaces with the sea-and-island-type pattern must fall within a range of 3% to 80%. Here, the surface coverage ratio refers to the ratio of the area of the island portions 61 relative to the surface area of the entire surface with the sea-and-island-type pattern.

If this surface coverage ratio is less than 3%, then the tackiness of the sea-and-island-type patterned surface of the prepreg is overly poor, causing a deterioration in the prepreg handling properties. In contrast, if the surface coverage ratio exceeds 80%, then the deaerating circuit for the prepreg is almost completely blocked off, which can cause internal voids and surface pinholes. In terms of achieving a favorable balance between tackiness and the size of the deaerating circuit, surface coverage ratios of 5% or more is preferred, and 60% or less is particularly preferred.

Furthermore, in a prepreg of the third embodiment, the weave intersection coverage ratio for the island portions 61 on the sea-and-island-type patterned surface, as represented by a formula (6) below, is at least 40%.

Island portions weave intersection coverage ratio $(\%)=(T/Y)\times 100$ (6)

T represents the number of island portions that cover weave intersections, and Y represents the total number of weave intersections of the reinforcing fiber woven fabric on the surface with the sea-and-island-type pattern. In the third embodiment, a weave intersection 64 refers to an intersection between the warp and the woof.

For example, in FIG. 6, the number of island portions 61 covering weave intersections 64 of the reinforcing fiber fabric is 11, namely T=11. On the other hand, in this figure Y=15, meaning that in the example shown, the island portions weave intersection coverage ratio is (11/15)×100=73%.

Figure 7:
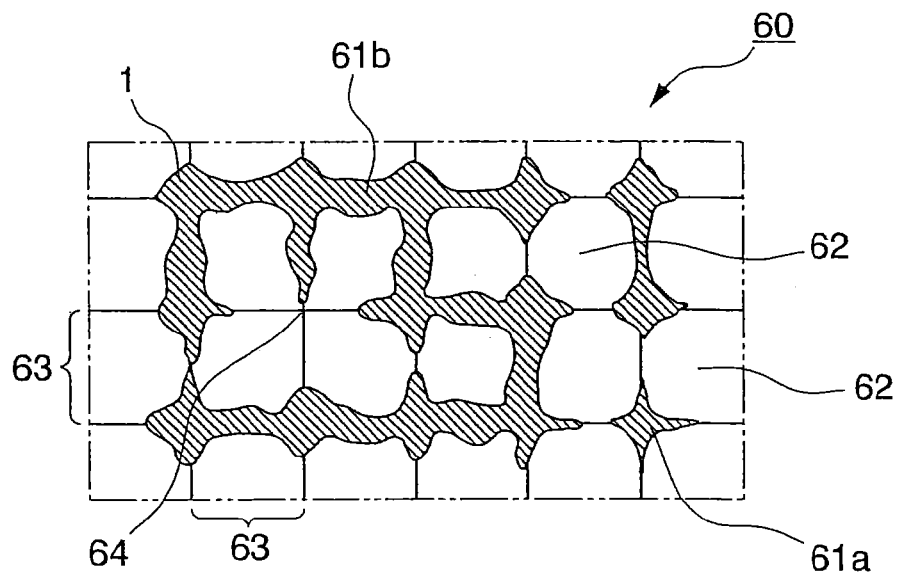
FIG. 7 is a schematic illustration of a comparative example, showing the surface of a prepreg wherein a island portions weave intersection coverage ratio is low.

In contrast, FIG. 7 represents a case where the surface of the woven fabric 60 contains a larger proportion of linked island portions 61b. In FIG. 7, the island portions weave intersection coverage ratio of island portions 61 is calculated from T=3 and Y=15, and yields a value of (3/15)×100=20%.

When calculating the number T of island portions that cover weave intersections in the present invention, resin-impregnated portions 65 that do not cover a weave intersection of the reinforcing fiber fabric are not counted.

When the resin surface coverage ratio is within the range from 3% to 80%, if the weave intersection coverage ratio for the island portions 61 is less than 40%, then as shown in FIG. 7, the probability of the existence of a sea portion 62 that is totally enclosed by an island portion 61 on the sea-and-island-type patterned surface increases. In such a case, the air that reaches the fabric surface through the deaerating circuit during molding has no where to escape, increasing the likelihood of undesirable pinhole formation.

In those cases where both surfaces of the fabric are sea-and-island-type patterned surfaces, the surface coverage ratio must be within a range of 3% to 80% on both surfaces, and the weave intersection coverage ratio for the island portions 61 is preferably at least 40% on both surfaces.

In terms of productivity and the like, the most preferred process for producing a prepreg according to the third embodiment is a process in which a resin composition is applied to a resin support sheet, this matrix resin supported on the resin support sheet is bonded to one surface of a reinforcing fiber woven fabric, a protective film is affixed to the other surface of the reinforcing fiber woven fabric to prevent the adhesion of any foreign matter, and heating and/or pressure is then used to impregnate the matrix resin into the reinforcing fiber woven fabric, thus forming a prepreg wherein the surface of the reinforcing fiber woven fabric on the side of the protective film displays a sea-and-island-type pattern comprising resin-impregnated portions (island portions) where the matrix resin is present at the surface, and fiber portions (sea portions) where the resin composition is not present at the surface.

The heating conditions used within this process preferably employ a temperature that ensures that the viscosity of the matrix resin reaches no more than 5000 poise, whereas the pressure conditions preferably use a linear pressure of 49 to 780 kPa, thus ensuring a prepreg with a satisfactory deaerating circuit. In the case of an epoxy resin composition, the temperature required to ensure a viscosity of no more than 5000 poise is typically within a range of 40 to 80° C.

The protective film used in the process for producing a prepreg according to the third embodiment preferably displays favorable releasability relative to the matrix resin, and suitable examples include release sheets or polyethylene film that have been surface-treated with silicone.

Furthermore, the resin support sheet can also use a resin film formed from a polyolefin and a release sheet or the like. In addition, when the matrix resin is applied to the resin support sheet, a process can be used which employs a resin support sheet with an irregular surface, so that when the matrix resin is applied to this resin support sheet, and the matrix resin-coated surface of the resin support sheet and the reinforcing fiber woven fabric are stuck together, only the matrix resin applied to the convex portions of the resin support sheet is transferred to, and impregnated into the reinforcing fiber woven fabric, thus generating a sea-and-island-type pattern.

If a prepreg of the third embodiment is produced using this process, then the matrix resin is impregnated into the reinforcing fiber woven fabric mainly at the weave intersections points, and is exuded out at the weave intersections on the opposite surface (the protective film side) of the fabric, impregnating the reinforcing fibers in the vicinity of the surface. As a result, this process results in almost no island portions that do not cover weave intersections.

Furthermore, in a different process from that described above, the matrix resin can be applied directly to the surface of the reinforcing fiber woven fabric that is to become the sea-and-island-type patterned surface, either uniformly or in a non-uniform manner, or by sticking a resin support sheet to the surface, and in a similar manner to that described above, this process also causes the matrix resin to impregnate into the fabric along the weave intersections, so that following impregnation, almost all of the matrix resin is connected to an island portion that covers a weave intersection.

However, although production is possible using this alternative process, adjusting the impregnation conditions (the temperature and pressure conditions) to ensure a favorable surface coverage ratio and a favorable island portions weave intersection coverage ratio requires considerable skill.

In other words, regardless of the process used to produce a prepreg according to the third embodiment, during impregnation the matrix resin penetrates into the interior of the woven fabric along the weave intersections from the surface, and exudes from the weave intersections on the opposite surface, meaning the number of island portions that do not cover weave intersections is essentially nil.

A fourth embodiment of the present invention is an intermediate material for FRP molding in which a substrate containing essentially no impregnated thermosetting resin composition is bonded to at least one side of a prepreg comprising a matrix resin and reinforcing fibers, wherein the ratio (B)/(A) between the thickness (A) of the prepreg, and the thickness (B) of the substrate is within a range of 0.1 to 2.5.

(Matrix Resin)

There are no particular restrictions on the matrix resin used in the fourth embodiment, although from the viewpoints of the handling of the prepreg, such as the tack and drape characteristics, and the moldability, thermosetting resin compositions are preferred. Examples of the thermosetting resin that forms the main component of the thermosetting resin composition include epoxy resins, phenol resins, bismaleimide resins, BT resins, cyanate ester resins, and benzoxazine resins, although epoxy resins are preferred, as their superior adhesion to reinforcing fibers improves the mechanical properties of the product FRP. Furthermore, phenol resins are also preferred, as not only do they display excellent flame retardancy, but they are also ideally suited to lacquer-type prepreg production processes.

(Reinforcing Fibers)

There are no particular restrictions on the reinforcing fibers used in the prepreg of this fourth embodiment, and any reinforcing fibers that offer high strength and high elasticity can be used, including glass fiber, carbon fiber, aramid fiber, boron fiber, and PBO fiber. Of these, reinforcing fibers that use either glass fiber or carbon fiber are preferred, as they offer excellent balance between elasticity and strength, and yield FRPs with excellent mechanical properties.

(Production Process for Prepreg)

The process for producing a prepreg used in the fourth embodiment may utilize the hot melt process described above, although even when a prepreg that has been produced by a lacquer process is used, oven molding is still capable of producing a molded product with no internal voids or surface pinholes, meaning the effects of the present invention are particularly significant for prepregs produced by a lacquer process.

A lacquer process is a prepreg production process in which the reinforcing fibers are impregnated with a thermosetting resin composition that has been diluted with a solvent, and the solvent is subsequently removed. Suitable methods for impregnating the reinforcing fibers with the solvent solution include immersing the reinforcing fibers in the thermosetting resin composition solution, or applying the solution to a roller and then transferring the solution to the reinforcing fibers using the roller. However, effecting the impregnation by immersing the reinforcing fibers in the solution provides superior impregnation of the thermosetting resin composition solution into the reinforcing fibers, and is consequently preferred. Furthermore, suitable methods for removing the solvent include warm or hot air dryers, or drying under reduced pressure, although warm air drying is the most preferred in terms of productivity.

(Prepreg and Substrate)

An intermediate material for FRP molding according to the present invention comprises an aforementioned prepreg with a substrate containing essentially no impregnated thermosetting resin composition bonded to at least one side of the prepreg. By allowing this substrate to function as a deaerating circuit, any internal air pockets can be removed easily during molding, meaning the substrate performs an important role in preventing the occurrence of internal voids and surface pinholes within the molded product. If a substrate is bonded to both surfaces of a prepreg, then the deaerating circuit is larger than that generated when a substrate is bonded to only one surface, which can offer advantages in some cases. However, the loss of tackiness on both surfaces can cause a deterioration in productivity, and as such, in most cases, a substrate is preferably only bonded to one surface, and the other surface is left with the prepreg exposed, thus retaining favorable tackiness.

As described above, in an intermediate material for FRP molding according to the fourth embodiment, the substrate acts as a deaerating circuit during molding, acting as a pathway for guiding air out of the structure during the molding process. However, during molding, the substrate must also become impregnated with the matrix resin that is impregnated within the reinforcing fibers, so that following molding, a single integrated body molded product is obtained that contains no internal voids or surface pinholes. As a result, the substrate must comprise sufficient air gaps to function satisfactorily as the deaerating circuit, but must also have a quantity of air gaps that can be completely filled by the matrix resin during the molding process. Accordingly, the quantity of air gaps within the substrate must be matched with the prepreg used in the fourth embodiment of the present invention. As a result of careful investigations, it was discovered that a favorable quantity of air gaps could be achieved by controlling the ratio between the respective thickness values for the prepreg and the substrate. Specifically, the ratio (B)/(A) between the thickness (A) of the prepreg, and the thickness (B) of the substrate must be within a range of 0.1 to 2.5. As described above, the substrate must comprise sufficient air gaps to function satisfactorily as the deaerating circuit, but those air gaps must be completely filled by the matrix resin during the molding process. The lower limit of the above range is even more preferably 0.15 or greater, and most preferably 0.2 or greater. If the ratio is less than 0.1, then ensuring sufficient air gaps for the substrate to function satisfactorily as the deaerating circuit becomes difficult, and air can remain trapped following molding. On the other hand, the upper limit of the above range is even more preferably no more than 1.5, and is most preferably 1.1 or less. If the ratio exceeds 2.5, then the air gaps may not be completely filled during the molding process, meaning residual air may be left following molding.

(Measurement of the Thickness of the Prepreg and the Substrate)

In this description, the thickness (A) of the prepreg and the thickness (B) of the substrate refer to values measured using vernier calipers. During measurement, care must be taken to ensure that the vernier calipers are pressed against the prepreg or the substrate so that the thickness does not vary. Particularly in the case of the substrate, if there is a concern that, even with the vernier calipers pressed against the substrate, the measurement error during measurement is overly large, then a photograph is preferably taken of the substrate cross section and enlarged, so that measurements can be conducted with minimal error. In addition, in those cases where a substrate is bonded to both surfaces of the prepreg, the sum of the individual thickness values for the two substrates is used as the thickness value (B).

(Substrate Construction)

Suitable examples of the material used for forming the substrate include fibrous thermoplastic resins and reinforcing fibers. The use of fibrous thermoplastic resins is preferred as it enables an improved interlayer reinforcement effect to be achieved when layers of the intermediate material for FRP molding are laminated. Suitable examples of such materials include nylon, polyester, polyethylene, and polypropylene, and provided a deaerating circuit can be ensured, the material may be a net-like material, a material in which rods or fibers of the thermoplastic resin are aligned unidirectionally, or a laminated material in which these materials are overlaid at different angles. However, in order to best ensure an efficient deaerating circuit, the thermoplastic resin is most preferably in the form of a fibrous material, and suitable materials include woven fabrics formed from fibers, as well as materials in which the fibers are aligned unidirectionally and non-woven fabrics. Of these, non-woven fabrics are particularly desirable as they offer ready formation of the deaerating circuit.

Furthermore, the material for the substrate can also use non-thermoplastic resin fibers, and reinforcing fibers are particularly favorable. In those cases where reinforcing fibers are used as the material for the substrate, the same reinforcing fibers that were used to form the prepreg can be used, although different fibers may also be used.

In those cases where the same reinforcing fibers as those used in the prepreg are used, the substrate can be bonded to the prepreg so that the angle of alignment of the reinforcing fibers in the substrate matches the angle of alignment of the reinforcing fibers in the prepreg. However, bonding the two together so that the respective angles of alignment are different enables the lamination step during quasi-isotropic lamination or the like to be conducted with greater ease, and is consequently preferred. Quasi-isotropic lamination involves laminating layers with the angles of alignment set to [−45°/0°/45°/90°], so that overall, the FRP is isotropic and displays no anisotropy in terms of the FRP properties.

On the other hand, different reinforcing fibers from those used in the prepreg can be used for forming the substrate. In such cases, a hybrid FRP can be produced with considerable ease, which is ideal. For example, an FRP produced using an intermediate material in which glass fiber is used as the reinforcing fibers for forming the prepreg, and carbon fiber is used as the reinforcing fibers for forming the substrate becomes a glass/carbon fiber hybrid FRP, enabling optimal design of the cost performance balance. In this case, as was described above, the respective angles of alignment of the reinforcing fibers of the substrate and the reinforcing fibers of the prepreg may be either the same or different.

(Molding Using Prepregs or Intermediate Materials for FRP Molding According to the Present Invention)

When a FRP is produced using either a prepreg or an intermediate material for FRP molding according to the present invention, vacuum bag molding is the most preferred process, although molding using an autoclave or press molding can also be used.

In a process for producing FRP according to the present invention, primary curing is preferably conducted for at least 10 minutes at a primary curing temperature of no more than 150° C., and then the curing is preferably completed at a temperature equal to, or greater than, the primary curing temperature. Processes in which the primary curing is conducted at a temperature of no more than 100° C. are particularly preferred as a resin mold can be used instead of a metal mold, and heating can be conducted using solely steam, which provide significant cost reductions.

In addition, following the primary curing and subsequent removal from the mold, the product is preferably subjected to further curing at a temperature either equal to, or higher than, the primary curing temperature, thus enabling a further reduction in the high-temperature molding time.

A prepreg or intermediate material for FRP molding according to the present invention provides a deaerating circuit during molding, meaning air from the voids can be guided out through the deaerating circuit and expelled outside the FRP, thus making these materials ideally suited to vacuum bag molding and oven molding.

Regardless of whether or not oven molding is used, when molding is conducted using a prepreg or an intermediate material for FRP molding according to the present invention, the prepreg or FRP molding intermediate material is preferably laminated, and then placed under a vacuum, so that the air contained within the prepreg or FRP molding intermediate material can be completely removed before the temperature is raised. Specifically, a degree of vacuum of no more than 600 mmHg is preferred, and a degree of vacuum of no more than 700 mmHg is even more desirable. If the temperature is raised before satisfactory deaerating has been completed, then the viscosity of the matrix resin may fall too far, causing the deaerating circuit to become undesirably blocked before the air within the prepreg or FRP molding intermediate material has been completely removed. Furthermore, if the process atmosphere is returned to normal pressure in the middle of the molding process, then there is a danger that air that has already been removed may penetrate back into the interior of the prepreg or FRP molding intermediate material, and as a result, the vacuum is preferably maintained throughout the molding process.

In addition, when molding is conducted using a prepreg or an intermediate material for FRP molding according to the present invention, the structure is preferably held for at least 1 hour, prior to curing, and while the viscosity of the matrix resin is no more than 10,000 poise, before the curing step is conducted. During this holding period, the matrix resin can migrate, making it easier to force the air out of the molded product. Holding the structure while the viscosity of the matrix resin is no more than 5000 poise before the curing step is even more desirable. Furthermore, holding the structure in this state for at least 2 hours before curing is also particularly preferred.

A preferred process for molding a FRP using either a prepreg or a FRP molding intermediate material according to the present invention involves raising the temperature from a temperature at least 20° C. below the molding temperature to the molding temperature at a rate of no more than 1° C./minute. The raising of the temperature is initiated once the vacuum has been established, and is conducted with the vacuum state maintained, although during the temperature raising step, if the resin starts to move very suddenly, then small quantities of residual air can become trapped in the cured product under vacuum conditions, namely, under reduced pressure conditions of no more than 50 Torr, and this trapped air can cause residual interlayer voids and surface pinholes.

Consequently, it is very important to control the speed of movement of the resin during the temperature raising step, to ensure that any last small quantities of residual air are expelled from the molded product. In order to achieve this aim, the rate of temperature increase can be kept low, although at very low temperatures, the viscosity of the matrix resin is high, and the movement of the air is too slow, meaning an extremely long time would be required for the matrix resin to impregnate right into the corners of the sheet-like reinforcing fiber substrate, causing a problematic deterioration in productivity.

Because the viscosity of the resin reaches its minimum value near typical molding temperatures, slowing the rate of temperature increase to no more than 1° C./minute from a temperature at least 20° C. below the molding temperature produces a favorable effect, and is consequently preferred. Lowering the rate of temperature increase to no more than 1° C./minute from a temperature at least 30° C. below the molding temperature is even more preferred, and lowering the rate from a temperature at least 40° C. below the molding temperature is particularly desirable. Furthermore, slowing the rate of temperature increase to no more than 0.7° C./minute is even more preferred, and to no more than 0.5° C./minute is particularly desirable.

Furthermore, when prepregs or FRP molding intermediate materials according to the present invention are laminated, then in those cases where the upper and lower surfaces of the prepregs or FRP molding intermediate materials can be obviously distinguished, arranging the layers with the same surface of each layer facing in the same direction enables a more reliable establishment of the deaerating circuit, and is consequently preferred.

EXAMPLES

In the series of examples 1 to 7 and comparative examples 1 to 3 described below, a matrix resin was prepared by uniformly mixing the resin constituents described below. The mixing conditions were as follows. All of the components except for DICY7 and DCMU99 were mixed uniformly in a kneader set to 100° C., and the temperature of the kneader was then lowered to 50° C., the DICY7 and DCMU99 were added, and mixing was continued to generate a uniform mixture.

<Matrix Resin Composition>

Epikote 828 (a bisphenol A epoxy resin, manufactured by Japan Epoxy Resins Co., Ltd.) 40 parts by mass Epikote 1001 (a bisphenol A epoxy resin (solid at room temperature), manufactured by Japan Epoxy Resins Co., Ltd.) 40 parts by mass Epiclon N740 (a phenol novolac epoxy resin, manufactured by Dainippon Ink and Chemicals, Incorporated) 20 parts by mass (a bisphenol A epoxy resin (solid at room temperature), manufactured by Japan Epoxy Resins Co., Ltd.)

DICY7 (dicyandiamide, manufactured by Japan Epoxy Resins Co., Ltd.) 5 parts by mass DCMU99 (3,4-dichlorophenyl-N,N-dimethylurea, manufactured by Hodogaya Chemical Co., Ltd.) 5 parts by mass Furthermore, the materials used in each of the examples and comparative example, and the methods used for evaluation are described below.

<Short Fibers of Thermoplastic Resin>

Nylon 12 was subjected to melt spinning to generate a short fiber with a size of 200 tex, and these fibers were then cut to a length of 5 mm to complete preparation of the short fibers. Hereafter, these are referred to simply as short fibers.

<Compressive Strength after Impact>

Measurement of the compressive strength after impact was measured in accordance with the SACMA recommended method SRM2-88, and involved measuring the compressive strength following application of a 270 lb-in impact.

<Method of Measuring Tg>

Figure 8:
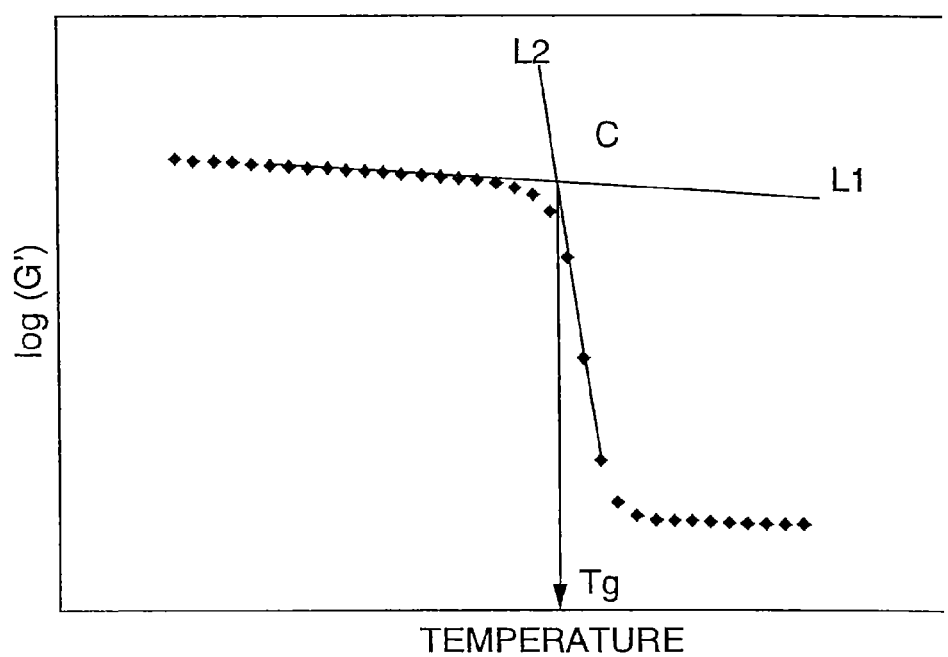
FIG. 8 is an example of a graph showing the results of measuring the dynamic modulus of elasticity of a matrix resin, as well as a method of determining the value of Tg from such a graph.

Using a RDA-700 device manufactured by Rheometrics Inc., or a viscoelastic spectrometer with equivalent functionality, the temperature was raised from approximately 0° C. at a rate of 2° C./minute, and the dynamic modulus of elasticity (G') of the sample was measured. The results of the measurements were graphed with temperature along the horizontal axis and logarithm of G' along the vertical axis as shown in FIG. 8, a tangent L1 was drawn from the glass region and another tangent L2 was drawn from the transition region, and the temperature corresponding with the point of intersection C of the two tangents was used as Tg (see FIG. 8).

<Minimum Viscosity>

Using a dynamic analyzer (RDA-200) manufactured by Rheometrics, Inc., viscosity measurements were conducted from room temperature (23° C.) to 150° C. using a rate of temperature increase of 5° C./minute and an angular velocity of 10 rad/second. The lowest value observed for the viscosity during this test was recorded as the minimum viscosity for the resin composition.

<Surface Coverage Ratio>

A smooth and transparent polyethylene film of thickness 20 μm was bonded to a sea-and-island-type patterned surface of a prepreg by application of a metal heated roll press under conditions including a temperature of 40° C., a pressure of 1 atom, and a roll speed of 5 m/minute. The surface was then photographed using a CCD camera of at least 2 megapixels, and an image analysis system (detailed fine image analysis "IP1000") manufactured by Asahi Engineering Co., Ltd. was used to determine the surface area covered by the thermosetting resin, by measuring the surface area of those regions where the thermosetting resin had stuck to the polyethylene film causing a change in coloring, and the ratio of this surface area relative to the total surface area of the prepreg was then used to determine the surface coverage ratio.

<Island Portions Weave Intersection Coverage Ratio>

In the same manner as described above for the measurement of the surface coverage ratio, a smooth and transparent polyethylene film of thickness 20 μm was bonded to a prepreg by application of a metal heated roll press under conditions including a temperature of 40° C., a pressure of 1 atom, and a roll speed of 5 m/minute. The coated prepreg was then cut into a 10 cm×10 cm square, the surface of the prepreg to which the polyethylene film had been bonded was photographed using a CCD camera, and the aforementioned image analysis system was used to determine the number of individual regions (T: the number of islands) where the thermosetting resin had stuck to the polyethylene film causing a change in coloring.

Subsequently, the polyethylene film was peeled off, the surface of the prepreg was photographed again with the CCD camera, and an image analyzer was used to measure the number of weave intersections (Y) within the reinforcing fiber woven fabric on the sea-and-island-patterned surface. The island portions weave intersection coverage ratio was then calculated from the formula (I).

<Evaluation of FRP External Appearance (for the Existence of Pinholes)>

Using the method described below, a piece of chalk was pressed against the surface of the produced flat sheet of FRP and used to coat the entire surface of the sheet. The surface was then wiped lightly with a dry cloth or the like, making any pinholes very visible, and enabling an evaluation of whether or not any pinholes exist.

<Evaluation of FRP Voids>

Following evaluation for pinholes, the flat sheet of FRP was cut through the center in a direction perpendicular to the thickness direction, and the cross section was photographed at 20× magnification. An evaluation of whether or not any voids exist was then made by inspecting the cross section photograph.

<Evaluation of Tackiness>

Under an atmosphere at a temperature 23° C. and a humidity of 50%, a steel plate of thickness 2 mm that had been treated with a releasing agent was stood up vertically with respect to the ground, and a prepreg that had been cut to a size of 10 cm×10 cm was stuck to the surface of the steel plate. If the prepreg remained attached to the steel plate with no signs of peeling after 1 minute, then the surface tackiness of the prepreg was adjudged to be favorable.

Example 1

The matrix resin was applied uniformly to a release sheet at a resin weight of 430 g/m², thus forming a resin film. This resin film was supplied to a piece of carbon fiber cloth TRK (510, manufactured by Mitsubishi Rayon Co., Ltd. (fiber weight 646 g/m², 2/2 twill) from the bottom surface of the cloth, thus impregnating the carbon fiber cloth with the resin. The temperature during impregnation was 60° C., and the pressure was adjusted to complete the preparation of a prepreg. When the resin impregnation ratio of the thus produced prepreg was measured, the result was 90%, thus confirming the prepreg as conforming to the present invention.

Next, using the release sheet side of the thus produced prepreg of the present invention as the tool side (a stainless steel plate), a 4-ply laminate was formed at 0° C. The layers from the second layer up were arranged so that the release sheet side of the prepreg faced the opposite side of the previous layer. Vacuum bag molding was conducted, and a 30 cm square panel was subjected to oven molding. The operation of laminating the prepregs presented absolutely no problems.

The molding conditions used for the prepreg laminate were as follows. Namely, the temperature was raised from room temperature to 50° C. at a rate of 3° C./minute, the laminate was then held at 50° C. for 30 minutes under reduced pressure at 20 Torr to allow deaerating, and subsequently, with the reduced pressure state maintained at 20 Torr, the temperature was raised to 120° C. at a rate of 1° C./minute. The temperature was then held at 120° C. for 1 hour, thus yielding a 30 cm square panel.

The thus obtained panel had no surface voids, and when the panel was cut through the center and the resulting cross section was inspected, no internal voids were visible.

Comparative Example 1

With the exception of altering the impregnation temperature to 70° C., a prepreg was prepared in the same manner as the example 1. When the cross-section of the prepreg was inspected, it was found that the resin had migrated right through to the opposite surface from the release sheet, producing a resin impregnation ratio of 100%. This prepreg was then laminated, and a panel was molded in the same manner as the example 1. The operation of laminating the prepregs presented absolutely no problems, but the surface of the molded panel contained pinholes. Furthermore, when a central cross section of the panel was inspected in the same manner as the example 1, a plurality of internal voids was observed.

Comparative Example 2

A resin film was prepared in the same manner as the example 1, and a prepreg was then formed. However, the impregnation of the carbon fiber cloth with the resin was conducted at room temperature, with only pressure being applied. Almost no impregnation occurred, and absolutely no resin was visible at the opposite surface to where the resin was supplied. When the resin impregnation ratio of the thus produced prepreg was measured, the result was 30%. This prepreg was then laminated, and a panel was molded in the same manner as the example 1. The lamination was conducted with the release sheet side of the prepregs facing the tool surface.

A small number of pinholes were identified in the surface of the thus produced panel, and when a central cross section of the panel was inspected in the same manner as the example 1, internal voids were also observed.

A piece of carbon fiber cloth TR3110 (number of filaments 3000, plain weave, weight 200 g/m$^2$, manufactured by Mitsubishi Rayon Co., Ltd.) was impregnated with the same resin composition as that used in the example 1, thus forming a prepreg of the present invention. When the resin impregnation ratio was measured, the result was 70%. A 16-ply laminate of this prepreg was formed using an alignment pattern of [0°/45°/90°/−45°/0°/45°/90°/−45°/−45°/90°/45°/0°/−45°/90°/45°/0°], and a 1 m square panel was molded. The lamination was conducted with the release sheet side of the prepregs facing the tool surface. The operation of laminating the prepregs presented absolutely no problems.

Under the molding conditions used, the temperature was raised from room temperature to 45° C. at a rate of 5° C./minute, the laminate was then held at 45° C. for 60 minutes under reduced pressure at 7 Torr to allow deaerating, and subsequently, the temperature was raised to 80° C. at a rate of 2° C./minute, and from 80° C. to 120° C. at a rate of 0.7° C./minute. The temperature was then held at 120° C. for 1 hour, thus yielding a 1 m square panel.

The thus obtained panel had no surface pinholes, and when the interior was inspected in the same manner as the example 1, no internal voids were visible.

Example 4

An epoxy resin composition #830 manufactured by Mitsubishi Rayon Co., Ltd. was used as the matrix resin. Using this resin, a resin film was prepared in the same manner as the example 1, and this was then impregnated into a TRK510. The impregnation temperature was set to 50° C. When the resin impregnation ratio of the thus obtained prepreg was measured, the result was 60%, thus confirming the prepreg as conforming to the present invention. Using this prepreg, a molded product of the shape shown in FIG. 3 was molded. A wooden female mold was used as the molding die. An 8-ply laminate was formed using an alignment pattern of [0°/45°/90°/−45°/−45°/90°/45°/0°], with the release sheet side of the prepreg facing the tool surface, and subsequently prepregs arranged so that the release sheet side faced the opposite side of the previous layer. The operation of laminating the prepregs presented absolutely no problems.

Under the molding conditions used, the temperature was raised from room temperature to 45° C. at a rate of 2° C./minute, the laminate was then held at 45° C. under reduced pressure at 2 Torr for 4 hours to allow deaerating, and subsequently, the temperature was raised to 80° C. at a rate of 0.5° C./minute. The temperature was then held at 80° C. for 2 hours, thus yielding a molded product.

The thus obtained molded product had no surface pinholes, and when the product was cut open and the exposed cross section was inspected, no internal voids were visible.

Example 5

Using the resin used in the example 1, and using a non-crimped fabric Quadraxial-Carbon-Gelege (+45°: Carbon 267 g/m$^2$, 0°: Carbon 268 g/m$^2$, −45°: Carbon 267 g/m$^2$, 90°: Carbon 268 g/m$^2$, stitching: PES 6 g·m$^2$, weight 1076 g/m$^2$) manufactured by Saertex Co., Ltd. as a sheet-like reinforcing fiber substrate, a prepreg was prepared in the same manner as the example 1. However, the resin weighting was 717 g/m$^2$. When the resin impregnation ratio was measured, the result was 75%, thus confirming the prepreg as conforming to the present invention. A 2-ply laminate was prepared with the prepreg surfaces facing in the same direction, and a FRP was then molded. The molding was conducted under the same molding conditions as the example 1. The thus obtained molded product displayed no internal voids and no surface pinholes.

Example 6

8.1 parts by mass of the short fibers were added to 100 parts by mass of the thermosetting resin, and then mixed uniformly in a kneader at 50° C., thus yielding a thermosetting resin composition.

Using a roll coater, this resin composition was applied to a release sheet with a resin weight of 133 g/m$^2$. This resin film was supplied at room temperature to one surface of a piece of carbon fiber cloth TR3110, a sheet-like reinforcing fiber substrate manufactured by Mitsubishi Rayon Co., Ltd. (fiber weight 200 g/m$^2$, plain weave), and a prepreg of the present invention was prepared by heating to 40° C., applying pressure from a roller, and ensuring that the resin did not migrate from the supply surface right through to the opposite surface. When the resin impregnation ratio of the thus produced prepreg was measured, the result was 60%.

A 24-ply laminate of this prepreg was formed with the fiber alignment direction (of the warp) set to [45°/0°/−45°/90°/45°/0°/−45°/90°/45°/0°/−45°/90°/90°/−45°/0°/45°/90°/−45°/0°/45°/90°/−45°/0°/45°], and oven molding was used to mold a 500 mm×500 mm panel. Under the molding conditions used, following lamination of the prepregs, the laminate was first placed under vacuum, and was then heated for 2 hours at 50°

C., and then a further 2 hours at 80° C., before being returned to normal pressure and held for 1 hour at 130° C., thus yielding a CFRP panel. The rate of temperature increase used was 0.5° C./minute, and the rate of cooling following the 1 hour at 130° C. was 2° C./minute.

The thus obtained CFRP panel had no pinholes and displayed an extremely favorable external appearance. Furthermore, when the panel was cut though the center, no internal voids were visible. When a test specimen was cut from the panel and the compressive strength after impact was measured, the result was an extremely high 262 MPa.

Comparative Example 3

A prepreg was prepared in the same manner as the example 6. However, during the step for integrating the resin film with the sheet-like reinforcing fiber substrate, the level of impregnation was increased, so that almost no non-impregnated portions remained on the opposite surface to the surface from which the resin was supplied. The resin impregnation ratio was 100%.

The thus obtained prepreg was laminated and molded in the same manner as the example 6, yielding a CFRP panel. This CFRP panel displayed pinholes, and the external appearance was poor. Furthermore, when the panel was cut through the center, a plurality of internal voids was visible. When the compressive strength after impact was measured for this panel, the result was low, and 222 MPa.

Example 7

With the exception of using a unidirectional, sheet-like reinforcing fiber substrate (with a fiber weight of 200 g/m$^2$) for stitching-reinforcement formed by stitching unidirectionally aligned TR50S-12L fibers with polyester fiber, a prepreg of the present invention was formed in exactly the same manner as the example 6. The resin impregnation ratio of the thus obtained prepreg was 45%.

The thus obtained prepreg was laminated and molded in the same manner as the example 6, yielding a CFRP panel. When the panel was cut through the center, no internal voids were visible. When the compressive strength after impact was measured for this panel in the same manner as the example 6, the result was a very high 325 MPa.

Comparative Example 4

A prepreg was prepared in the same manner as the example 7. However, during the step for integrating the resin film with the sheet-like reinforcing fiber substrate, the level of impregnation was increased, so that resin exuded from the opposite surface to the surface from which the resin was supplied. The resin impregnation ratio was 100%.

The thus obtained prepreg was laminated and molded in the same manner as the example 7, yielding a CFRP panel. When this panel was cut through the center, internal voids were visible. When the compressive strength after impact was measured for this panel in the same manner as the example 6, the result was 283 MPa, considerably lower than that observed for the example 7.

Example 8

(A) A carbon fiber cloth TRK510 (fiber weight 646 g/m$^2$, 2/2 twill, thickness 355 μm), manufactured by Mitsubishi Rayon Co., Ltd., was used as the sheet-like reinforcing fiber substrate, and (B) an epoxy resin #830, manufactured by Mitsubishi Rayon Co., Ltd., which can be cured by heating at 80° C. for 2 hours, was used as a curable resin composition.

The curable resin composition (B) was applied to a release sheet with a resin weight of 175 g/m$^2$. One of these release sheets was then bonded to both the top and bottom surfaces of the sheet-like reinforcing fiber substrate (A), with both of the curable resin composition surfaces facing inwards. The bonding was conducted at room temperature, with the tackiness of the curable resin composition (B) used to effect the bonding. When the thus obtained FRP molding intermediate material of the present invention was cut open and the interior was inspected, it was found that the portions into which the curable resin composition had not impregnated existed as a continuous portion.

A 10-ply laminate of the thus produced prepreg of the present invention was prepared, with the prepregs aligned in the same direction, and a 800 mm×800 mm CFRP panel was molded. Under the molding conditions used, atmospheric pressure was first confirmed as having fallen to no more than 700 mmHg, and the temperature was then raised from room temperature at a rate of 1° C./minute, and held at 50° C. for 3 hours, before the temperature increase was resumed and heating was continued at 80° C. for 2 hours, thus curing the laminate. The viscosity of the #830 resin at 50° C., measured using a DSR200 device manufactured by Rheometrics, Inc., with a rate of temperature increase of 2° C./minute, was 3500 poise.

The surface of the produced CFRP panel displayed absolutely no pinholes. Furthermore, when the FRP panel was cut though the center and the cut cross section was inspected, no internal voids were visible.

Comparative Example 5

A prepreg was prepared using the same material as the example 8. However, the resin was applied at a weight of 350 g/m$^2$, and was bonded to only one surface of the sheet-like reinforcing fiber substrate (A). The thus obtained FRP molding intermediate material was molded in the same manner as the example 1, thus yielding a FRP panel.

Although no pinholes were observed in the surface of the produced CFRP panel, when the panel was cut though the center and the cut cross section was inspected, a plurality of small internal voids was visible.

Comparative Example 6

A prepreg was prepared using the same material as the example 8. The resin was applied at a weight of 175 g/m$^2$ in the same manner as the example 8, but rather than simply bonding the resin to both surfaces of the sheet-like reinforcing fiber substrate (B), the structure was passed twice through a fusing press under conditions of 60° C., 0.1 MPa, and a speed of 25 cm/minute, thus ensuring good impregnation. When the thus produced prepreg was cut though the center and the cut cross section was inspected, the curable resin composition had impregnated right into the center of the substrate, and although a few portions with no curable resin composition were visible, each of these non-impregnated portions was partitioned off by the curable resin composition.

The produced prepreg was molded in the same manner as the example 8, yielding a FRP panel, but the surface of the thus obtained FRP panel contained a plurality of pinholes. Furthermore, when the panel was cut though the center and the cut cross section was inspected, a large number of variously sized internal voids were visible.

Example 9

A prepreg was prepared in the same manner as the example 8. However, an epoxy resin composition that was capable of being cured by heating at 80° C. for 2 hours, formed by uniformly mixing the resin components listed below at a temperature of 55° C., was used as the curable resin composition (B), and when this curable resin composition (B) was applied to the release sheet, a resin weight of 215 g/m² was used.

Epikote 1001 (a bisphenol A epoxy resin (solid at room temperature), manufactured by Japan Epoxy Resins Co., Ltd.) 70 parts by mass Epiclon N740 (a phenol novolac epoxy resin, manufactured by Dainippon Ink and Chemicals, Incorporated) 20 parts by mass Novacure HX3722 (a microcapsule based latent curing agent, manufactured by Asahi Kasei Corporation) 10 parts by mass Omicure 94 (an amine based curing agent, manufactured by PTI Japan Co., Ltd.) 5 parts by mass Using the thus produced prepreg, a CFRP panel was produced in the same manner as the example 8. The surface of the produced CFRP panel displayed absolutely no pinholes. Furthermore, when the CFRP panel was cut though the center and the cut cross section was inspected, no internal voids were visible. In addition, when the flexural strength of the product CFRP panel was measured in accordance with ASTM D790, a high strength value of 680 MPa was obtained.

Comparative Example 7

A prepreg was prepared in the same manner as the example 9. However, following bonding of the resin film, the structure was passed twice through a fusing press under conditions of 60° C., 0.1 MPa, and a speed of 25 cm/minute, thus ensuring good impregnation. When the thus produced prepreg was cut, and the cut cross section was inspected, the matrix resin had impregnated right into the center of the substrate, and although a few portions with no matrix resin were visible, each of these non-impregnated portions was partitioned off by the matrix resin, and no continuous non-impregnated portion existed.

Using the produced prepreg, a CFRP panel was produced in the same manner as the example 9. The surface of the thus obtained CFRP panel contained a plurality of pinholes. Furthermore, when the panel was cut though the center and the cut cross section was inspected, a large number of variously sized internal voids were visible. Furthermore, when the CFRP panel was cut though the center and the cut cross section was inspected, no internal voids were visible. In addition, when the flexural strength of the product CFRP panel was measured in accordance with ASTM D790, a value of 420 MPa, which was lower than that observed for the example 9, was obtained.

Example 10

An epoxy resin composition (#340, manufactured by Mitsubishi Rayon Co., Ltd., minimum viscosity 20 poise) was applied uniformly to a release sheet wherein one surface thereof is release-treated, using a roll coater, at a weight of 133 g/m². A carbon fiber woven fabric manufactured by Mitsubishi Rayon Co., Ltd. (TRK510 (fiber weight: 646 g/m²)) was then bonded to the resin composition side of this resin support sheet. Another release sheet that had undergone release-treatment in the same manner as described above was then overlaid on the carbon fiber fabric side such that a release-treated surface is provided on the fabric. The resulting structure was then pressed and heated by passage through a pair of heated rollers at 40° C., thus forming a prepreg.

The thus obtained prepreg had a resin composition surface coverage ratio of 3%, and the weave intersection coverage ratio for the island portions of the resin composition that existed at the surface was 60%. Furthermore, evaluation of the workability revealed that the prepreg displayed favorable tackiness, and stuck favorably to a steel plate.

Using this prepreg, a FRP was produced in the manner described below. 10 prepreg sheets that had been cut to dimensions of 20 cm long×20 cm wide were laminated. This laminate was provided on a steel base plate (thickness 2 mm), the surface of which had been treated with a releasing agent. Subsequently, a polytetrafluoroethylene film containing holes of 2 mm diameter at 10 cm intervals, a nylon cloth of weight 20 g/m², and a glass fiber non-woven fabric of weight 40 g/m² were placed in sequence on top of the laminate. The resulting structure was then covered and sealed using a nylon film. The space sealed within the outer nylon film was then placed under reduced pressure, and while the pressure was maintained at no more than 600 mmHg, the temperature was raised from room temperature to 130° C. at a rate of 2° C./minute, and was then held at 130° C. for 2 hours, thus yielding a FRP.

When the thus produced FRP was subjected to the evaluations described above, it was found that the surface on the base plate side of the molded FRP had a favorable external appearance with no pinholes, and a cross section photograph revealed no visible interlayer or intralayer voids.

Examples 11 to 14

Using the same resin composition and reinforcing fiber woven fabric as those used in the example 10, a series of fiber-reinforced fabric prepregs with the respective surface coverage ratios shown in Table 1 were prepared by conducting a plurality of repetitions of pressing and heating with a roller heated to 40°. Each of the prepregs had an island portions weave intersection coverage ratio of 60%.

Evaluation of these prepregs in the same manner as the example 10 revealed that all of the prepregs had favorable handling properties, and the produced FRPs all had favorable external appearances, and no voids.

Examples 15 and 16

Prepregs were prepared in the same manner as the example 11, but with the conditions altered to produce a resin composition surface coverage ratio of 40%. The number of repetitions of the impregnation step using the heated roll press was adjusted to produce island portions weave intersection coverage ratios of 100% and 50% respectively. Evaluation of these prepregs in the same manner as the example 10 revealed that both of the prepregs had favorable handling properties, and the produced FRPs both had favorable external appearances, and also displayed no interlayer or intralayer voids.

Examples 17 to 21

With the exceptions of altering the temperature during impregnation to 60° C. in the case of the example 17, increasing the minimum viscosity of the epoxy resin composition as shown in Table 2 in the case of the examples 18 and 19, and altering the weight of the carbon fiber fabric as shown in Table 2 in the case of the examples 20 and 21, prepregs were prepared in the same manner as the example 10. All of the prepregs displayed favorable tackiness, and the produced FRPs all had favorable external appearances, and displayed no voids.

Examples 22 and 23

With the exceptions of altering the minimum viscosity to 1100 poise in the case of the example 22, altering the fiber weight to 1600 g/m² in the case of the example 23, and setting the other values as shown in Table 2, prepregs were prepared in the same manner as the example 10. The tackiness of these prepregs was good. On the other hand, the FRPs produced from these prepregs did contain internal voids, although FRPs with no pinholes were obtained.

Example 24

With the exception of applying the resin composition on the release sheet with a uniform weighting per unit of surface area of 266 g/m², preparation was conducted in the same manner as the example 10, up to and including the heating and pressing using a pair of heated rollers. The resin support sheet was then peeled off, TR3110 was bonded to the same surface, and then a similar release sheet to that described above was overlaid on the side of the just bonded TR3110. The resulting structure was then pressed and heated again by passage through the pair of heated rollers at 40° C., and the overlaid release sheet was peeled off, yielding a prepreg in which both sides displayed a sea-and-island-pattern.

The surface coverage ratio of the thus obtained prepreg, totaled across both surfaces, was 50%, and the island portions weave intersection coverage ratio was 60%. This prepreg also stuck favorably to a steel sheet, and was adjudged to have a good level of tackiness. Furthermore, when this prepreg was used to conduct the molding evaluations described above, the molded FRP had a favorable external appearance with no surface pinholes, and no internal voids were observed.

Comparative Examples 8 to 10

With the exceptions of altering the surface coverage ratios, the island portions weave intersection coverage ratios, and the fiber weights to the values shown in Table 3, prepregs were prepared in the same manner as the example 9 and then evaluated. The evaluation results showed that the comparative example 8, which had a lower surface coverage ratio than the example 10, displayed only weak tackiness, and had poor handling properties. In contrast, the comparative example 9, which had an overly high surface coverage ratio when compared with the example 10, and the comparative example 10, which had a lower island portions weave intersection coverage ratio than the example 10, produced molded products with pinholes and interlayer voids, meaning products with satisfactory external appearances and mechanical characteristics could not be obtained.

A thermosetting resin composition acetone solution used in the examples 25 to 30 and the comparative examples 11 to 14 employed an acetone solution containing 60% by mass of the epoxy resin composition, and was prepared by dissolving an epoxy resin composition (solid at room temperature), comprising the constituents listed below, in acetone to generate a homogenous solution (hereafter referred to simply as the epoxy solution).

<Epoxy Resin Composition>

Epikote 828 (a bisphenol A epoxy resin (liquid at room temperature), manufactured by Japan Epoxy Resins Co., Ltd.) 50 parts by mass Epikote 1004 (a bisphenol A epoxy resin (solid at room temperature), manufactured by Japan Epoxy Resins Co., Ltd.) 30 parts by mass Epiclon N740 (a phenol novolac epoxy resin, manufactured by Dainippon Ink and Chemicals, Incorporated) 20 parts by mass DCMU99 (3,4-dichlorophenyl-N,N-dimethylurea, manufactured by Hodogaya Chemical Co., Ltd.) 5 parts by mass Example 25

A carbon fiber woven fabric Pyrofil TRK510 that used carbon fiber for both the warp and the woof (manufactured by Mitsubishi Rayon Co., Ltd., 2/2 twill fabric, fiber weight 646 g/m², thickness 0.57 mm) was impregnated by immersion in the epoxy solution, and was then dried by warm air drying at 40° C. to remove the solvent, thus yielding a prepreg with a resin content of 46.7% by mass (a resin weight of 564 g/m²). When the thickness of the prepreg was measured with vernier calipers, the measured thickness (A) was 0.85 mm. Using a carbon fiber woven fabric Pyrofil TR3110 that used carbon fiber for both the warp and the woof (manufactured by Mitsubishi Rayon Co., Ltd., plain weave, fiber weight 200 g/m², thickness (B)=0.23 mm) as a substrate, the substrate was bonded to one surface of the prepreg so that the warp and woof were aligned in the same direction as in the prepreg, thus forming an intermediate material for FRP molding. This intermediate material displayed a (B)/(A) ratio of 0.27, the overall fiber weight of the entire intermediate material was 846 g/m², and the resin content was 40% by mass.

The prepreg side surface of the thus obtained FRP molding intermediate material was stuck to a molding die, and a 3-ply laminate was then formed by overlaying the intermediate materials with the same angle of alignment and the same surfaces facing the same direction, and the thus formed 500 mm×500 mm flat sheet was then subjected to oven molding. The molding conditions were as follows. Namely, under a vacuum of no more than 5 Torr, the temperature was raised from room temperature to 50° C. at a rate of 3° C./minute, held at 50° C. for 3 hours, and then raised to 120° C. at a rate of 0.5° C./minute, and subsequently held at 120° C. for 2 hours, thus yielding a FRP panel.

Despite being formed by oven molding, as shown in Table 4, the thus obtained FRP panel displayed no surface pinholes, and when the FRP panel was cut through the center and the interior was inspected, no internal voids were visible.

Example 26

With the exceptions of altering the resin content to 57.1% by mass (a resin weight of 861 g/m²) and setting the thickness (A)=1.1 mm, a prepreg was prepared in the same manner as the example 25. Using a reinforcing fiber woven fabric (TRK510, thickness (B)=0.57 mm) as a substrate, which is same with those used in the prepreg, the substrate was bonded to one surface of the prepreg, with the direction of alignment of the reinforcing fibers inclined 45° relative to that of the prepreg, thus forming an intermediate material for FRP molding. This intermediate material displayed a (B)/(A) ratio of 0.52, the overall fiber weight of the entire intermediate material was 1292 g/m², and the resin content was 40% by mass.

The thus obtained FRP molding intermediate material was laminated with the angle of alignment of the warp fibers set to

[−45°/0°/45°/90°/90°/45°/0°/−45]°], and was then oven molded in the same manner as the example 24, yielding a FRP panel. In this example, because the intermediate material was a 0°/45° double layered structure, a 4-ply laminate of intermediate material units was formed.

As shown in Table 4, the thus obtained FRP panel displayed no surface pinholes, and when the FRP panel was cut through the center and the interior was inspected, no internal voids were visible.

Example 27

With the exceptions of replacing the TRK510 with roving glass cloth WR800 manufactured by Nitto Boseki Co., Ltd., and altering the resin content to 53.3% by mass (a resin weight of 450 g/m$^2$) and the thickness (A)=0.71 mm, a prepreg was prepared in the same manner as the example 25. A sheet of Pyrofil TR3110 was then bonded to one surface of the prepreg so that the warp and woof were aligned in the same direction as in the prepreg, thus forming a glass fiber/carbon fiber hybrid FRP molding intermediate material ((B)/(A)=0.32).

A 4-ply laminate was then formed by overlaying the thus obtained intermediate material with the same angle of alignment and the same surfaces facing the same direction, and the laminate was then subjected to oven molding in the same manner as the example 25, yielding a glass fiber/carbon fiber hybrid FRP. By using an intermediate material of the present invention, a hybrid FRP was able to be molded with considerable ease.

As shown in Table 4, the thus obtained FRP panel displayed no surface pinholes, and when the FRP panel was cut through the center and the interior was inspected, no internal voids were visible.

Example 28

With the exceptions of altering the resin content to 51.9% by mass (a resin weight of 697.5 g/m$^2$), and setting the thickness (A)=0.96 mm, a prepreg was prepared in the same manner as the example 25. Using Pyrofil TR3110 as the substrate, substrates were bonded to both the upper and lower surfaces of the prepreg so that the warp and woof were aligned in the same direction as in the prepreg, thus yielding an intermediate material for FRP molding. This intermediate material displayed a (B)/(A) ratio of 0.24, the overall carbon fiber weight of the entire intermediate material was 1064 g/m$^2$, and the resin content was 40% by mass.

A 10-ply laminate was then formed by overlaying the thus obtained intermediate material of the present invention, with the same angle of alignment and the same surfaces facing the same direction, and the laminate was then subjected to oven molding in the same manner as the example 25, yielding a FRP panel.

As shown in Table 4, the thus obtained FRP panel displayed no surface pinholes, and when the FRP panel was cut through the center and the interior was inspected, no internal voids were visible.

Example 29

With the exceptions of replacing the epoxy resin with a phenol resin methanol solution Phenolite 5900 (approximately 60% by mass) manufactured by Dainippon Ink and Chemicals, Incorporated, and altering the resin content to 57.1% by mass (a resin weight of 861 g/m$^2$) and the thickness (A)=1.1 mm, a prepreg was prepared in the same manner as the example 25. A sheet of Pyrofil TR3110 was then bonded to one surface of the prepreg so that the carbon fibers were aligned in the same direction as in the prepreg, thus yielding an intermediate material for FRP molding. This intermediate material displayed a (B)/(A) ratio of 0.21, the overall carbon fiber weight of the entire intermediate material was 1292 g/m$^2$, and the resin content was 40% by mass.

A 3-ply laminate was then formed by overlaying the thus obtained intermediate material with the same alignment, and the resulting 1000 mm×1000 mm FRP panel was then subjected to oven molding. The molding was conducted under a vacuum of no more than 5 Torr, and the temperature was raised from room temperature to 90° C. at a rate of 0.5° C./minute, and then held at 90° C. for 20 hours.

As shown in Table 4, the thus obtained FRP panel displayed no surface pinholes, and when the FRP panel was cut through the center and the interior was inspected, no internal voids were visible.

Comparative Example 11

This comparative example presents an example in which a substrate is not bonded to the prepreg. With the exceptions of setting the resin content to 40.0% (a resin weight of 431 g/m$^2$), and the thickness (A)=0.73 mm, a prepreg was prepared in the same manner as the example 25.

Without bonding any substrates, an 8-ply laminate was formed using only the prepreg, with the prepreg alignments set to [−45°/0°/45°/90°/90°/45°/0°/−45°], and the resulting laminate was then subjected to oven molding in the same manner as the example 24, thus yielding a FRP panel.

As shown in Table 4, the thus obtained FRP panel contained a plurality of surface pinholes, and when the FRP panel was cut through the center and the interior was inspected, a plurality of internal voids was also visible.

Comparative Example 12

With the exceptions of altering the resin content to 40.5% (a resin weight of 430 g/m$^2$), and the thickness (A)=0.74 mm, a prepreg was prepared in the same manner as the example 25. A sheet of glass cloth H20 F5 104 (thickness (B)=0.04 mm) manufactured by Unitika Glass Fiber Co., Ltd. was then bonded to the prepreg as the substrate, yielding an intermediate material for FRP molding. This intermediate material displayed a (B)/(A) ratio of 0.05.

This FRP molding intermediate material was subjected to oven molding in the same manner as the example 25, yielding a FRP panel. As shown in Table 4, the thus obtained FRP panel contained surface pinholes, and when the FRP panel was cut through the center and the interior was inspected, internal voids were also visible.

Comparative Example 13

With the exceptions of altering the resin content to 32.0% (a resin weight of 300 g/m$^2$), and the thickness (A)=0.62 mm, a prepreg was prepared in the same manner as the example 25. A polyester fiber non-woven fabric (fiber weight 132 g/m$^2$, thickness (B)=1.7 mm) was bonded to the prepreg, yielding an intermediate material for FRP molding. This intermediate material displayed a (B)/(A) ratio of 2.74.

This FRP molding intermediate material was subjected to oven molding in the same manner as the example 25, yielding a FRP panel. As shown in Table 4, the surface of thus obtained FRP panel contained a plurality of resin non-impregnated portions, and when the FRP panel was cut through the center and the interior was inspected, a plurality of internal voids was also visible.

Example 30

Carbon fibers Pyrofil TR50S-12L manufactured by Mitsubishi Rayon Co., Ltd. were aligned unidirectionally with a fiber weight of 190 g/m$^2$, and the same method as the example 25 was then used to prepare a prepreg with a resin content of 30.2% by mass (a resin weight of 82.3 g/m$^2$), and a thickness (A)=0.18 mm. A non-woven fabric comprising nylon 12 fibers (fiber weight 20 g/m$^2$) with a thickness (B)=0.32 mm was bonded to one surface of the prepreg, yielding an intermediate material for FRP molding ((B)/(A)=1.78).

A 24-ply laminate was then formed by overlaying the thus obtained FRP molding intermediate material with the alignment of the carbon fibers set to [−45°/0°/45°/90°] 3s (wherein, 3s means a laminate produced by repeating the lamination repeating unit 3 times is then bonded to another laminate which is a mirror image. In other words, the initial 12-ply laminate is arranged with the carbon fiber side facing the die, and the subsequent 12-ply laminate is then arranged with the carbon fiber side facing the opposite direction to the die.) The resulting laminate was subjected to oven molding in the same manner as the example 24, yielding a FRP panel.

The thus obtained FRP panel contained no pinholes in either the surfaces or between the layers, and when the FRP panel was cut through the center and the interior was inspected, no internal voids were visible. A CAI (residual compressive strength after impact) measurement was performed for the panel. The CM measurement was conducted in accordance with the SRM2-88 method of SACMA. The applied impact was 1500 inch-pounds/inch. The result of the CM measurement on the panel was 350 MPa, a high value for a FRP.

Comparative Example 14

With the exceptions of altering the resin content to 35.0% (a resin weight of 102.3 g/m$^2$), and setting the thickness (A)=0.19 mm, a prepreg was prepared in the same manner as the example 25. A 24-ply laminate was produced using only the thus obtained prepreg, with the alignment set to [−45°/0°/45°/90°] 3 s, and the resulting laminate was subjected to oven molding in the same manner as the example 25, thus forming a FRP panel.

The thus obtained FRP panel had a few surface pinholes and interlayer voids, and when the FRP panel was cut through the center and the interior was inspected, internal voids were also visible. Furthermore, when a CAI measurement was conducted on the panel, the result was a comparatively low 210 MPa.

TABLE 1

|  | Example 10 | Example 11 | Example 12 | Example 13 | Example 14 | Example 15 | Example 16 |
|---|---|---|---|---|---|---|---|
| Surface coverage ratio (%) | 3 | 20 | 40 | 60 | 80 | 40 | 40 |
| Island portions weave intersection coverage ratio (%) | 60 | 60 | 60 | 60 | 60 | 40 | 100 |
| Minimum viscosity (poise) | 20 | 20 | 20 | 20 | 20 | 20 | 20 |
| Fiber weight of reinforcing fiber fabric (g/m$^2$) | 650 | 650 | 650 | 650 | 650 | 650 | 650 |
| External appearance (existence of pinholes) | No | No | No | No | No | No | No |
| Existence of voids | No | No | No | No | No | No | No |
| Tackiness | Good | Good | Good | Good | Good | Good | Good |

TABLE 2

|  | Example 17 | Example 18 | Example 19 | Example 20 | Example 21 | Example 22 | Example 23 | Example 24 |
|---|---|---|---|---|---|---|---|---|
| Surface coverage ratio (%) | 60 | 60 | 60 | 60 | 60 | 60 | 60 | 50 |
| Island portions weave intersection coverage ratio (%) | 50 | 50 | 50 | 50 | 50 | 60 | 60 | 60 |
| Minimum viscosity (poise) | 20 | 950 | 100 | 500 | 500 | 1100 | 500 | 20 |
| Fiber weight of reinforcing fiber fabric (g/m$^2$) | 650 | 650 | 650 | 50 | 1500 | 650 | 1600 | 400 |
| External appearance (existence of pinholes) | No | No | No | No | No | No | No | No |
| Existence of voids | No | No | No | No | No | Yes | Yes | No |
| Tackiness | Good | Good | Good | Good | Good | Good | Good | Good |

TABLE 3

|  | Comparative example 8 | Comparative example 9 | Comparative example 10 |
|---|---|---|---|
| Surface coverage ratio (%) | 2 | 81 | 70 |
| Island portions weave intersection coverage ratio (%) | 60 | 60 | 35 |
| Minimum viscosity (poise) | 20 | 20 | 20 |
| Fiber weight of reinforcing fiber fabric (g/m$^2$) | 650 | 650 | 650 |
| External appearance (existence of pinholes) | No | No | Yes |
| Existence of voids | Yes | Yes | Yes |
| Tackiness | Poor | Good | Good |

TABLE 4

|  | Example 25 | Example 26 | Example 27 | Example 28 | Example 29 | Example 30 | Comparative example 11 | Comparative example 12 | Comparative example 13 | Comparative example 14 |
|---|---|---|---|---|---|---|---|---|---|---|
| Prepreg reinforcing fibers | TRK510 | TRK510 | WR800 | TRK510 | TRK510 | TR50S-12L | TRK510 | TRK510 | TRK510 | TR50S-12L |
| Prepreg matrix resin | Epoxy resin | Epoxy resin | Epoxy resin | Epoxy resin | Phenol resin | Epoxy resin | Epoxy resin | Epoxy resin | Epoxy resin | Epoxy resin |
| Prepreg resin content (%) | 46.7 | 57.1 | 53.3 | 51.9 | 57.1 | 30.2 | 40.0 | 40.5 | 32.0 | 35.0 |
| Substrate | TR3110 | TRK510 | TR3110 | TR3110 | TR3110 | Non-woven fabric of nylon 12 fiber | None | H20 | Non-woven fabric of polyester fiber | None |
| Prepreg thickness (mm) (A) | 0.85 | 1.1 | 0.71 | 0.96 | 1.1 | 0.18 | 0.73 | 0.74 | 0.62 | 0.19 |
| Substrate thickness (mm) (B) | 0.23 | 0.57 | 0.23 | 0.23 | 0.23 | 0.32 | — | 0.04 | 1.7 | — |
| (B)/(A) | 0.27 | 0.52 | 0.32 | 0.24 | 0.21 | 1.78 | — | 0.05 | 2.74 | — |
| Pinholes and voids in FRP molded product | No | No | No | No | No | No | Yes | Yes | Yes | Yes |

TRK510: carbon fiber woven fabric Pyrofil TRK510, manufactured by Mitsubishi Rayon Co., Ltd.
TR3110: carbon fiber woven fabric Pyrofil TR3110, manufactured by Mitsubishi Rayon Co., Ltd.
WR800: roving glass cloth WR800, manufactured by Nitto Boseki Co., Ltd.,
TR50S-12L: Unidirectional material comprising carbon fibers Pyrofil TR50S-12L, manufactured by Mitsubishi Rayon Co., Ltd.
H20: glass cloth H20 F5 104, manufactured by Unitika Glass Fiber Co., Ltd.

INDUSTRIAL APPLICABILITY

The level of workability associated with conventional prepregs is retained, while a FRP with no internal voids or surface pinholes, and with excellent external appearance, can be produced using molding using only vacuum pressure, without the use of an autoclave.

The invention claimed is:

1. A prepreg, comprising:
a reinforcing fiber substrate in the form of a sheet and formed from a reinforcing fiber woven fabric, and
a matrix resin,
wherein at least one surface of said reinforcing fiber substrate displays a sea-and-island-type pattern comprising resin-impregnated portions (island portions) wherein said matrix resin is present at said surface, and fiber portions (sea portions) wherein said matrix resin is not present at said surface,
wherein a surface coverage ratio of said matrix resin on surfaces with said sea-and-island-type pattern is within a range of 3% to 80%, and
wherein a weave intersection coverage ratio for said island portions, represented by a formula (1) is at least 40%:

$$\text{island portions weave intersection coverage ratio (\%)} = (T/Y) \times 100 \quad (1)$$

wherein, T represents a number of island portions that cover weave intersections, and Y represents a number of weave intersections within said reinforcing fiber woven fabric on said surface with said sea-and-island-type pattern.

* * * * *